(12) United States Patent
Luscombe et al.

(10) Patent No.: US 12,038,031 B2
(45) Date of Patent: Jul. 16, 2024

(54) BEAM CLAMP, AND A MOUNTING ASSEMBLY

(71) Applicant: Polyplas International Pty Ltd, Rowville (AU)

(72) Inventors: Peter Luscombe, Rowville (AU); John Jansen Van Vuuren, Rowville (AU); Tinus Smith, Rowville (AU); Daryl Wong, Rowville (AU); James Renshaw, Rowville (AU)

(73) Assignee: Polyplas International Pty Ltd, Rowville (AU)

( * ) Notice: Subject to any disclaimer, the term of this patent is extended or adjusted under 35 U.S.C. 154(b) by 0 days.

(21) Appl. No.: 17/627,859

(22) PCT Filed: Jul. 20, 2020

(86) PCT No.: PCT/AU2020/050747
§ 371 (c)(1),
(2) Date: Jan. 18, 2022

(87) PCT Pub. No.: WO2021/012004
PCT Pub. Date: Jan. 28, 2021

(65) Prior Publication Data
US 2022/0316506 A1  Oct. 6, 2022

(30) Foreign Application Priority Data

Jul. 19, 2019  (AU) ................................ 2019902556

(51) Int. Cl.
*F16L 3/24* (2006.01)
*F16B 2/06* (2006.01)
(Continued)

(52) U.S. Cl.
CPC ............ *F16B 2/065* (2013.01); *F16B 31/021* (2013.01); *F16B 45/002* (2021.05); *F16L 3/24* (2013.01); *F16B 2/005* (2013.01); *F16L 3/11* (2013.01)

(58) Field of Classification Search
CPC ...... F16B 2/065; F16B 31/021; F16B 45/002; F16B 2/005; F16B 2/006; F16L 3/24; (Continued)

(56) References Cited

U.S. PATENT DOCUMENTS

| 1,237,525 | A | * | 8/1917 | Keator | ................... | F16B 13/141 |
|||||||248/228.6|
| 1,774,878 | A | * | 9/1930 | Fitzpatrick | ................ | F16L 3/24 |
|||||||248/72|

(Continued)

FOREIGN PATENT DOCUMENTS

| AU | 2014204518 B2 | 4/2015 |
| FR | 3048709 A1 | 9/2017 |
| JP | S5062696 U | 6/1975 |

OTHER PUBLICATIONS

International Search Report and Written Opinion received for International PCT Application No. PCT/AU2020/050747, dated Oct. 27, 2020, 14 Pages.

(Continued)

*Primary Examiner* — Tan Le
(74) *Attorney, Agent, or Firm* — EcoTech Law Group, P.C.

(57) ABSTRACT

A beam clamp for attachment to a flange of a structural building member and from which to support or brace a service component. The beam clamp has a clamp body, and a set screw. The clamp body includes a first jaw section with at least one mounting through hole, a second jaw section, a joining section that interconnects the first and second jaw sections, and a transverse opening that is to receive the (Continued)

flange. A contact surface on the second jaw section is formed with surface irregularities providing a roughness that enhances engagement of the contact surface with the flange. In use of the beam clamp, the contact surface is in contact with the flange of the structural member, the set screw is installed in the mounting through hole, and the flange is secured within transverse opening between the tip of the set screw and the contact surface.

18 Claims, 22 Drawing Sheets

(51) Int. Cl.
  *F16B 31/02* (2006.01)
  *F16B 45/00* (2006.01)
  *F16L 3/11* (2006.01)
  *F16B 2/00* (2006.01)

(58) Field of Classification Search
  CPC ... F16L 3/11; B25B 5/101; B25B 5/16; F16G 11/14
  USPC ...................................... 248/58, 63, 68.1, 72
  See application file for complete search history.

(56) References Cited

U.S. PATENT DOCUMENTS

| | | | | |
|---|---|---|---|---|
| 1,840,216 | A | | 1/1932 | Tormo |
| 3,310,513 | A | * | 3/1967 | Barie, Jr. ............. C09D 133/06 526/75 |
| 3,321,161 | A | | 5/1967 | Hirt |
| 4,019,705 | A | * | 4/1977 | Habuda, Sr. .............. F16L 3/11 248/228.6 |
| 4,570,885 | A | * | 2/1986 | Heath ....................... F16L 3/24 29/897 |
| 4,941,633 | A | | 5/1990 | Walker et al. |
| 7,806,375 | B1 | | 10/2010 | Kirschner |
| 2013/0056590 | A1 | * | 3/2013 | Kennedy ................ A62C 35/68 248/62 |
| 2013/0214098 | A1 | * | 8/2013 | Greenfield ............... F16L 3/11 248/62 |
| 2013/0243445 | A1 | | 9/2013 | Takahira et al. |
| 2020/0346323 | A1 | * | 11/2020 | Gunn ....................... F16L 3/11 |

OTHER PUBLICATIONS

European Search Report received for EP Application No. 20843645. 1, filed on Jul. 20, 2020, dated Jun. 21, 2023, 9 Pages.

* cited by examiner

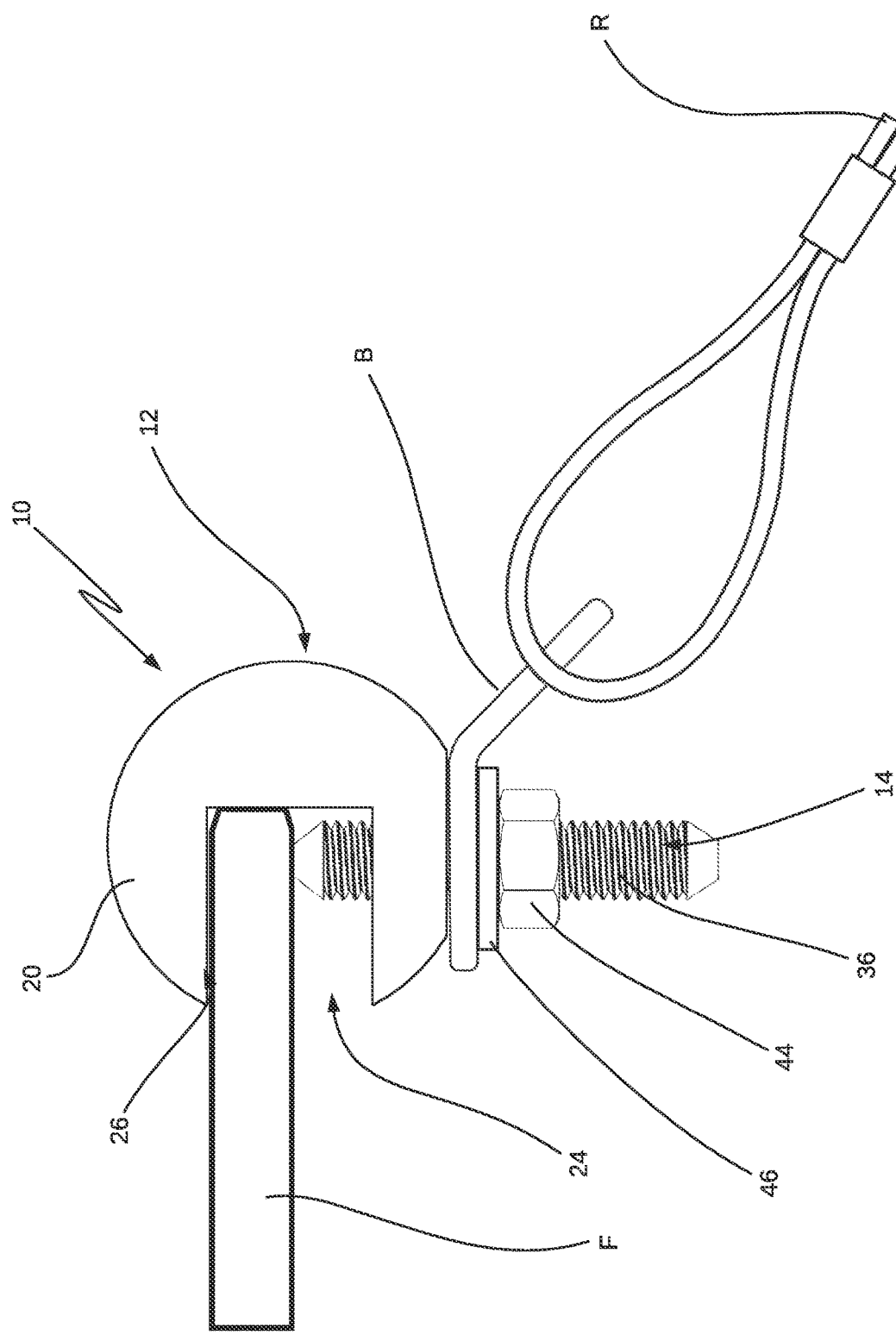

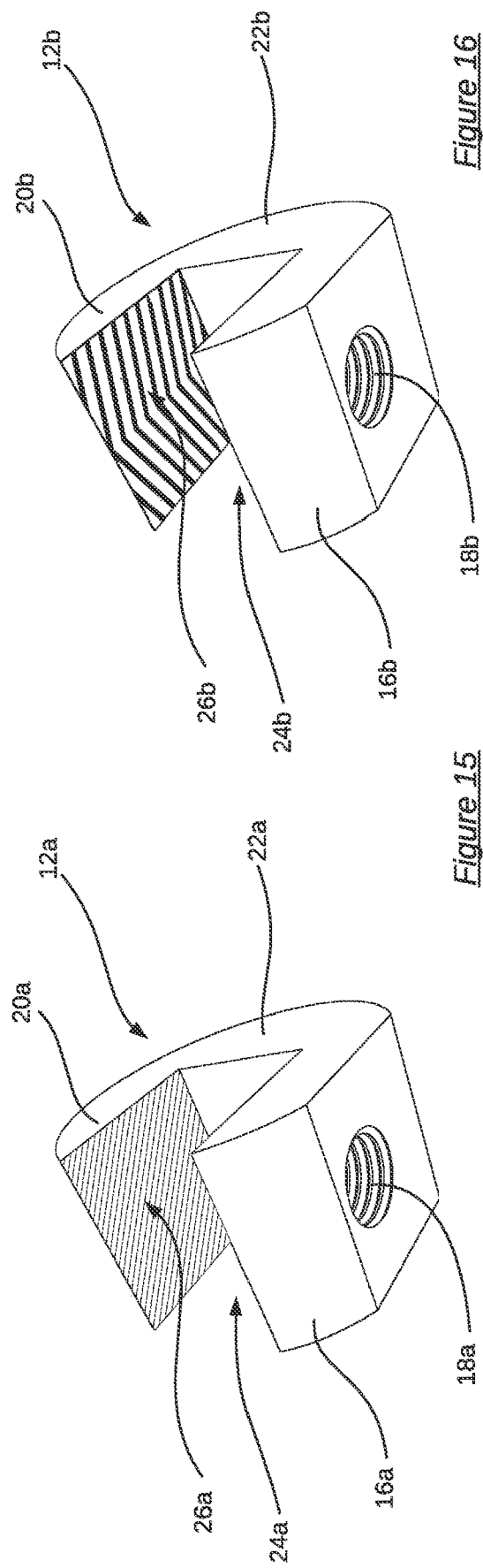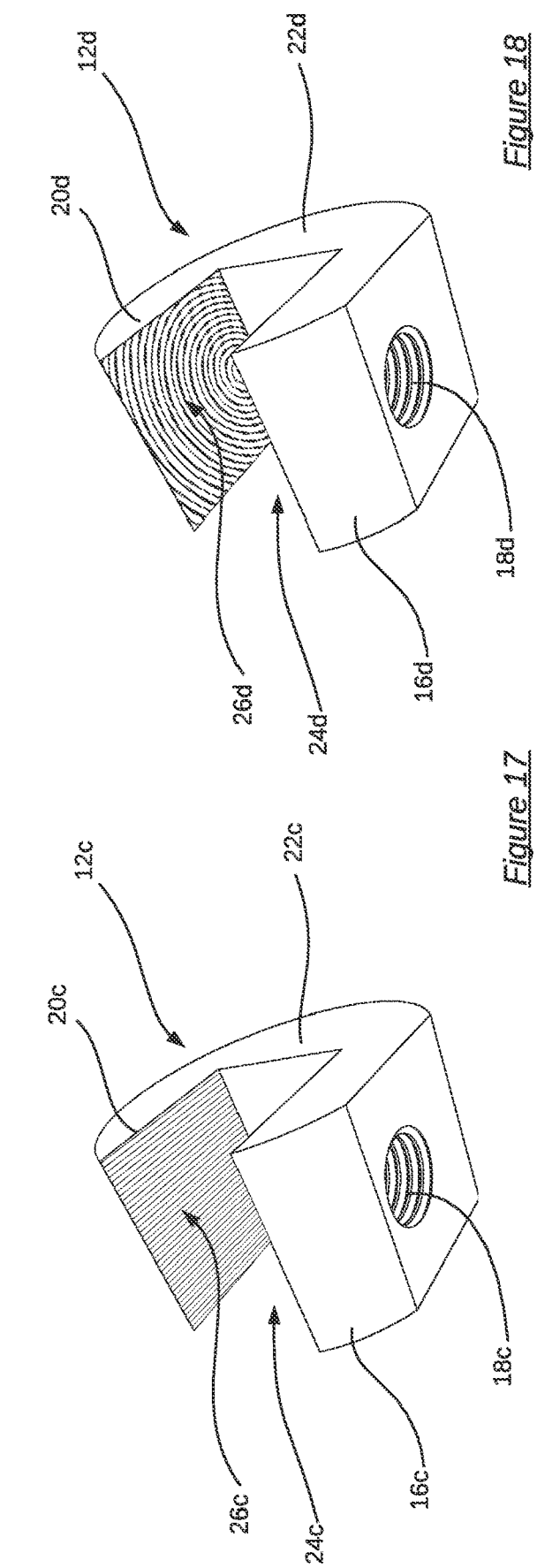

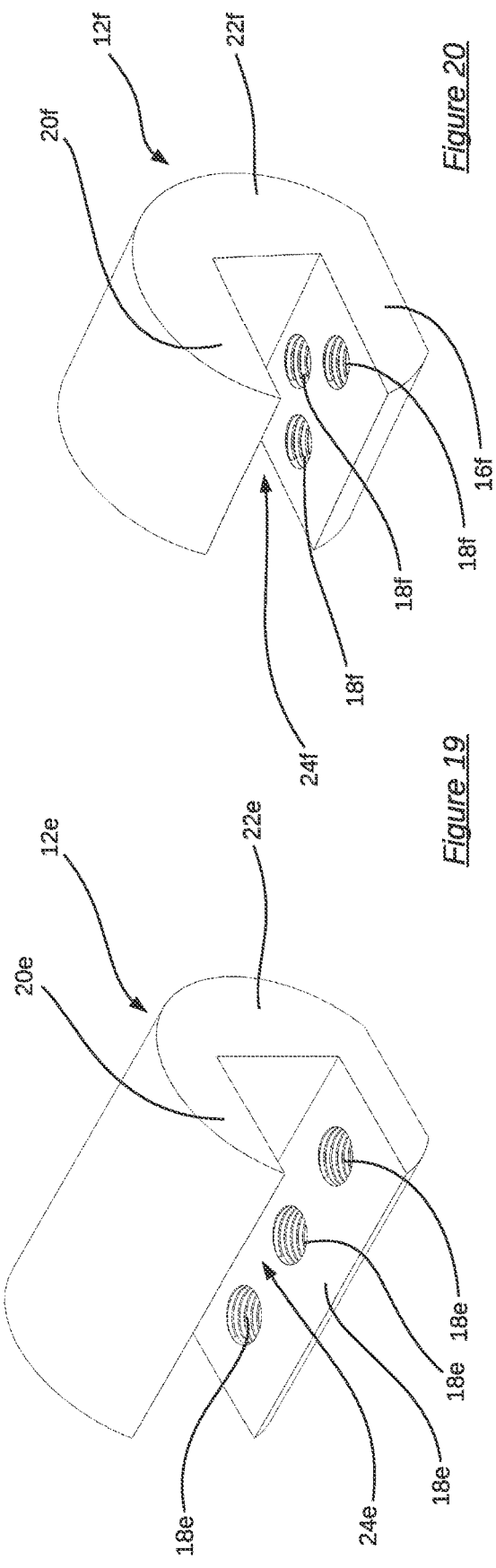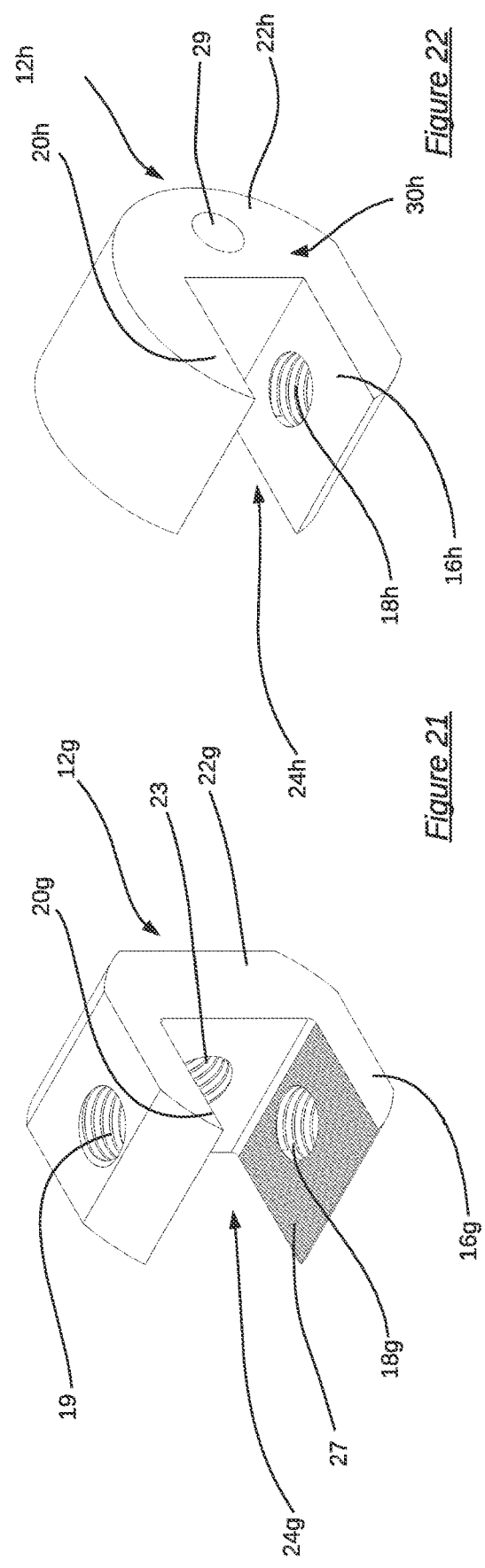

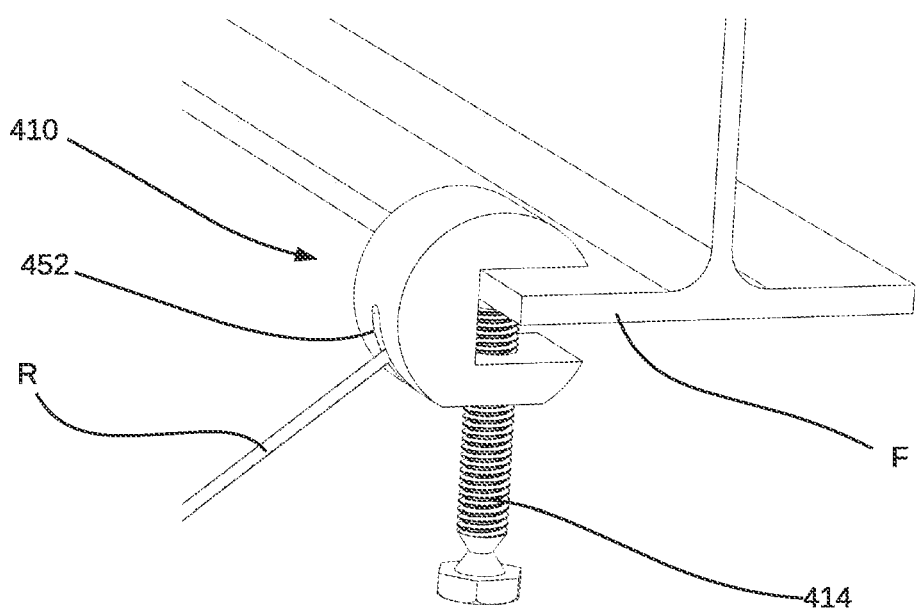
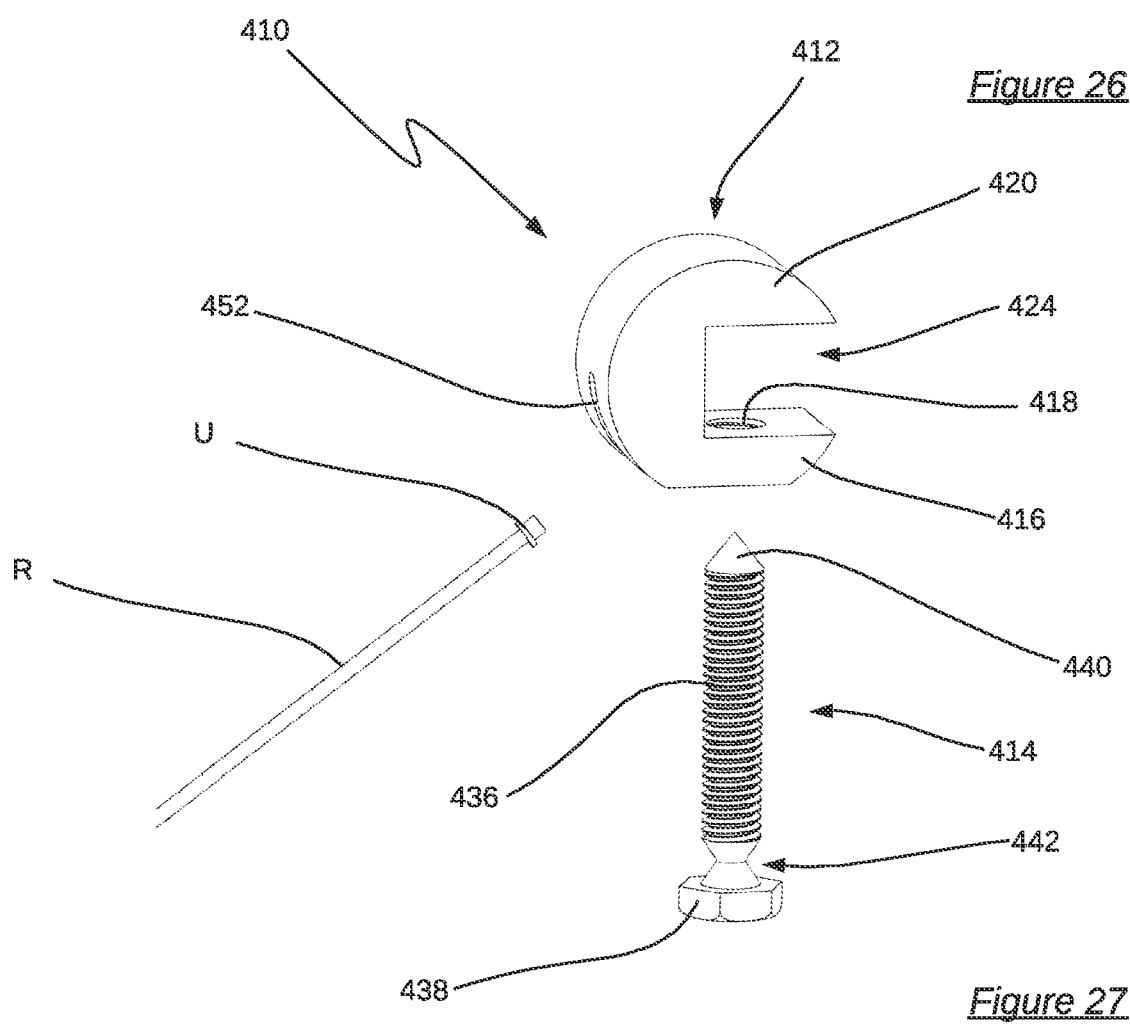
*Figure 26*
*Figure 27*

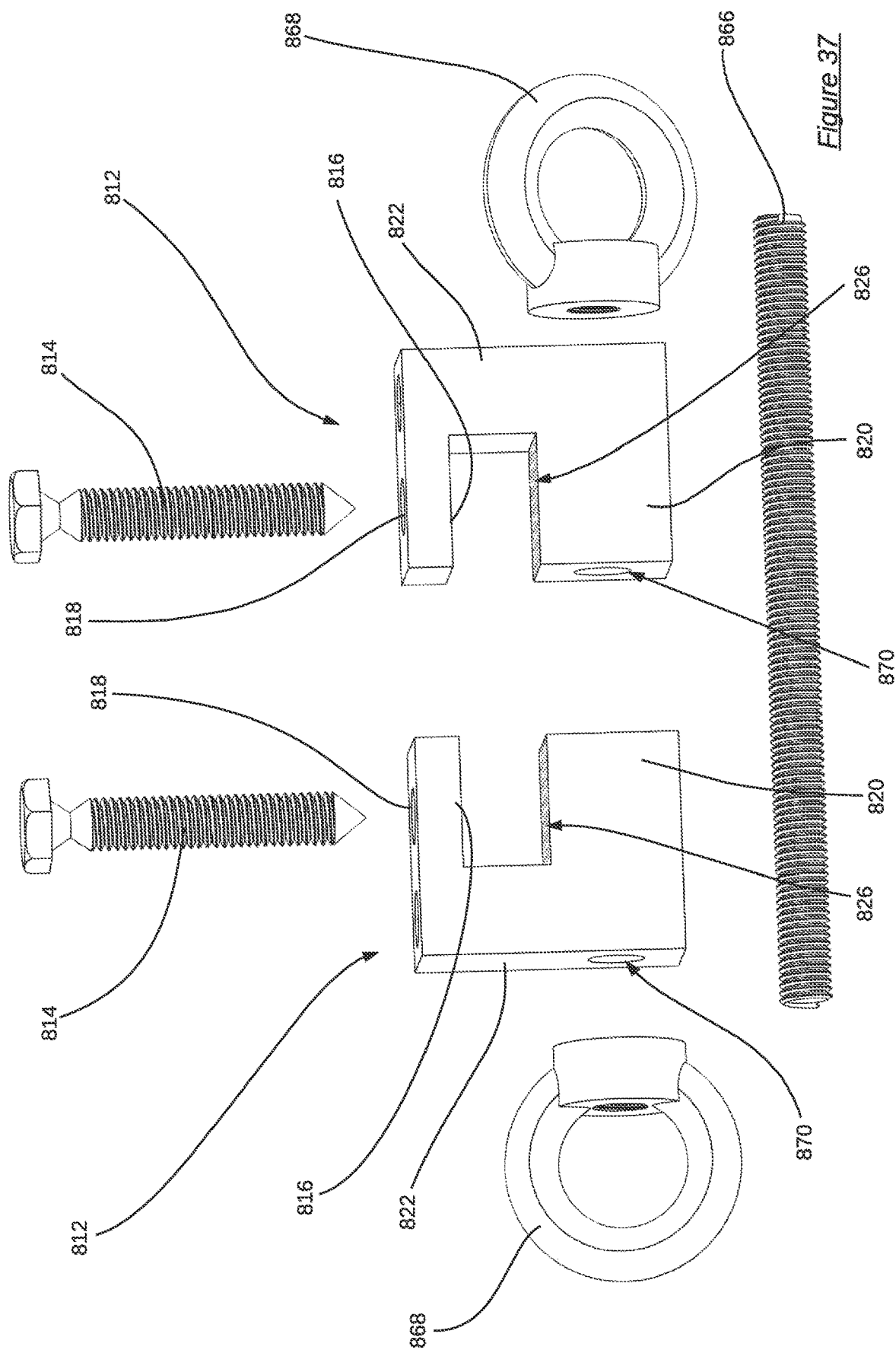

BEAM CLAMP, AND A MOUNTING ASSEMBLY

RELATED APPLICATION

This application claims the benefit from International Application No. PCT/AU2020/050747, which was granted an International filing date of Jul. 20, 2020, which in turns claims priority to from AU application number 2019902556 filed on Jul. 19, 2019, which is incorporated herein by reference for all purposes.

FIELD OF THE INVENTION

The present invention relates to a beam clamp for attachment to a flange of a structural building member and from which to support or brace a service component. The present invention also relates to a mounting assembly for attachment to a flange of a structural building member and from which to support or brace a service component.

BACKGROUND

It is known to attach service components to structural building members, such that the service component is supported by, or braced from the structural building member. Further, it is known to secure a beam clamp to a flange of the structural member, the beam clamp then providing an attachment point for use in supporting/bracing the service component.

For example, fluid distribution pipes can be supported by a joist or beam by attaching a beam clamp to a flange of the beam (or joist, purlin, etc.), and attaching the pipe to a ring (or a hanger, clamp, etc.), and securing a threaded rod (or wire rope, etc.) between the clamp and ring. In this way, a service component can be supported and/or braced, without the need to alter the structural member. The forces carried by the beam clamp can be static (for example, the mass of the service component, including any material conveyed within the service component, where appropriate), and/or dynamic (for example, forces induced by movement of the service component and/or structural building member).

Multiple beam clamps are commonly used to provide multiple connections of the service component to the structural member, and/or to multiple structural members. In this way, the load of the service component is distributed between multiple beam clamps, along the structural member, and/or across multiple structural members.

Each beam clamp will have a load rating to limit the likelihood of the beam clamp failing in service. As will be appreciated, the load rating of beam clamps is inversely proportional to the number of beam clamps required to support/brace a nominal service component. Further, the load rating of beam clamps is inversely proportional to the supply and installation cost. Thus, there is increased cost in supply and installation of beam clamps with low load ratings.

Common failure modes of beam clamps include deformation of the clamp body (caused by the load supported by the beam clamp exceeding the yield strength of the clamp body material), improper or inappropriate installation, and the beam clamp slipping from the flange of the structural member.

There is a need to address the above, and/or at least provide a useful alternative.

SUMMARY

There is provided a beam clamp for attachment to a flange of a structural building member and from which to support or brace a service component, the beam clamp comprising:
a clamp body that includes:
a first jaw section that includes at least one mounting through hole,
at least one second jaw section,
a joining section that interconnects the first and second jaw sections,
a transverse opening that is to receive the flange, the transverse opening being defined by the first and second jaw sections and the joining section, and
a contact surface on the at least one second jaw section, wherein in use of the beam clamp, the contact surface is in contact with the flange of the structural member, and wherein the contact surface is formed with surface irregularities providing a roughness that enhances engagement of the contact surface with the flange; and
at least one set screw that is to be installed in the mounting through hole,
whereby, in use of the clamp, the flange is secured within transverse opening between the tip of the at least one set screw and the contact surface.

In at least some embodiments, the surface irregularities are in the form of one or more sets of alternating ridges and furrows that are formed in the contact surface.

The ridges and furrows can be substantially parallel to one another. In some preferred embodiments, the ridges and furrows are formed so as to be substantially transverse to the direction of insertion of the flange into the transverse opening.

The entire contact surface can be provided with the surface irregularities. Alternatively or additionally, the at least one second jaw section has a pair of lateral faces and the contact surface forms vertices with the lateral faces, and wherein the surface irregularities extend the width of the contact surface between the vertices.

Preferably, the average amplitude of the surface irregularities is less than 1 mm (millimetre). More preferably, the average amplitude of the surface irregularities is between 2 μm (micrometre) and 100 μm.

In some embodiments, the ridges and furrows formed in the contact surface are substantially linear, and also parallel. In some alternative embodiments, the ridges and furrows may be non-parallel. In certain alternative embodiments, the ridges and furrows may be arcuate. Alternatively or additionally, the ridges and furrows can be concentric circular sectors.

Preferably, the ratio of the width of the second jaw section between the pair of lateral faces to the minimum separation of the first and second jaw sections is at least 1.25:1.

Preferably, the ratio of the depth of the second jaw section to the minimum separation of the first and second jaw sections is at least 1.5:1.

In some embodiments, the surface irregularities are created by a cutting tool that is used to form the transverse opening in the clamp body.

Preferably, the clamp body is made of a hardened steel. Alternatively or additionally, the clamp body is made of a material that has a minimum hardness of 150 BHN. Preferably, the clamp body is made of a material that has a minimum hardness of 170 BHN. More preferably, the clamp body is made of a material that has a minimum hardness of at least 200 BHN. In some embodiments, the clamp body is made of a material that has a hardness of approximately 235 BHN.

In at least some embodiments, at least a portion of the first and/or second jaw sections are tapered such that the thickness of the portion of the respective jaw section reduces in a direction away from the joining section.

In some embodiments, the second jaw section is tapered along its length such that the thickness of the second jaw section tapers in a direction away from the joining section.

In some embodiments, the first jaw section has an outer portion that is on the opposing side of the at least one mounting through hole to the joining section, and the outer portion has a thickness tapers in a direction away from the joining section. Preferably, the first jaw section has a central portion that defines the at least one mounting hole and an inner portion that is between the central portion and the joining section, and the inner and central portions have a substantially constant thickness.

In certain embodiments, the set screw has a shank with a waisted formation that acts as a stress concentrator such that the shank shears within the waisted formation when a predetermined torque is applied to the shank.

Preferably, the narrowest diameter of the waisted portion is less than the minor diameter of the external thread on the shank.

Preferably, the waisted formation is adjacent the head of the set screw. Alternatively or additionally, the waisted formation is between the head of the set screw and the externally threaded portion of the shank.

In some embodiments, the waisted formation has a one-sheet hyperboloid shape. In some alternative embodiments, the waisted formation has a first portion that is a convergent conical frustum, and a second portion that is a divergent conical frustum.

Preferably, the set screw has a tip with an end face with a surface area that is less than the cross sectional area of the shank of the set screw, the cross sectional area being in a plane that is transverse to the longitudinal direction of the shank.

Alternatively or additionally the set screw tip tapers in a direction away from the head of the screw. Preferably, the set screw tip tapers to a point. In some alternative embodiments, the set screw tip is at least partially domed shaped. In some further alternative embodiments, the set screw tip has a concave formation in the tip, such that the end of the tip defines an annulus.

The set screw tip can have an engagement surface that is formed with surface irregularities providing a roughness that enhances engagement of the set screw with the flange.

Preferably, the set screw is made of hardened steel. Alternatively or additionally, the set screw is made of a material that has a minimum hardness of 150 BHN. Preferably, the set screw is made of a material that has a minimum hardness of 170 BHN. More preferably, the set screw is made of a material that has a minimum hardness of at least 200 BHN. In some embodiments, the set screw is made of a material that has a hardness of approximately 235 BHN.

In at least some embodiments, the beam clamp further comprises a locking nut that is to locate on a portion of the shank of the set screw that projects from the first jaw section away from the transverse opening, wherein the service component is supported or braced by a component that includes an eyelet that, in use of the beam clamp, is captured between the locking nut and the clamp body.

Alternatively or additionally, the clamp body can include one or more mounting points, the service component is supported or braced by an attachment component that mounts to at least one of the mounting points, wherein the service component is attached to the beam clamp by the attachment component.

In some embodiments, the mounting points include any one or more of:
a secondary mounting hole for receiving the attachment component,
an internally threaded secondary mounting hole for engagement with an external thread of the attachment component,
an aperture that extends through the clamp body through which to pass an elongate portion of the attachment component,
a capturing formation that is formed in the clamp body, the capturing formation being shaped to receive a ferrule formation on the attachment component, and
a channel in the clamp body that extends between two co-planar faces of the clamp body, wherein the attachment component includes a elongate first connecting portion that is to be installed in the channel, and at least one second connecting portion that interconnects with the elongate first connecting portion, wherein the first and second connecting portions are interconnected when the first connecting portion is in the channel in a manner that places the first connecting portion in tension so as to resist removal of the first elongate connecting element from the channel, and wherein the service component can be supported or braced by the first elongate connecting element.

In embodiments in which the mounting points include an internally threaded secondary mounting hole, the internally threaded secondary mounting hole can be a blind hole.

Alternatively, the beam clamp installed on the flange forms a throughway within a part of the transverse opening, the throughway being bounded by the flange, the clamp body and the set screw, and wherein the service component can be supported or braced by a wire rope that is looped through the throughway.

In embodiments in which the mounting points include one or more channels that each extend between two opposing faces, each opposing face is preferably each part of a recessed formation in the clamp body that receives a portion of the first or second connection portion, whereby the recessed formations resists lateral movement of the elongate first connecting portion outwardly of the channel.

There is also provided a beam clamp for attachment to a flange of a structural building member and from which to support or brace a service component, the beam clamp comprising:
a clamp body that includes:
a first jaw section that includes at least one mounting through hole,
at least one second jaw section,
a joining section that interconnects the first and second jaw sections, and
a transverse opening that is to receive the flange, the transverse opening being defined by the first and second jaw sections and the joining section; and
a set screw that is to be installed in the mounting through hole, the set screw having a shank with a waisted formation that acts as a stress concentrator such that the shank shears within the waisted formation when a predetermined torque is applied to the shank, whereby, in use of the clamp, the flange is secured within transverse opening between the tip of the at least one set screw and the contact surface.

Preferably, the narrowest diameter of the waisted portion is less than the minor diameter of the external thread on the shank.

Preferably, the waisted formation is adjacent the head of the set screw.

In some embodiments, the waisted formation has a one-sheet hyperboloid shape. In some alternative embodiments, the waisted formation has a first portion that is a convergent conical frustum, and a second portion that is a divergent conical frustum.

Preferably, the set screw has a tip with an end face with a surface area that is less than the cross sectional area of the shank of the set screw, the cross sectional area being in a plane that is transverse to the longitudinal direction of the shank.

Alternatively or additionally, the set screw tip tapers in a direction away from the head of the screw. Preferably, the set screw tip tapers to a point. In some alternative embodiments, the set screw tip is at least partially domed shaped. In some further alternative embodiments, the set screw tip has a concave formation in the tip, such that the end of the tip defines an annulus.

The set screw tip can have an engagement surface that is formed with surface irregularities providing a roughness that enhances engagement of the set screw with the flange.

Preferably, the set screw is made of hardened steel. Alternatively or additionally, the set screw is made of a material that has a minimum hardness of 150 BHN. Preferably, the set screw is made of a material that has a minimum hardness of 170 BHN. More preferably, the set screw is made of a material that has a minimum hardness of at least 200 BHN. In some embodiments, the set screw is made of a material that has a hardness of approximately 235 BHN.

In at least some embodiments, the beam clamp further comprises a locking nut that is to locate on a portion of the shank of the set screw that projects from the first jaw section away from the transverse opening, wherein the service component is supported by a component that includes an eyelet that, in use of the beam clamp, is captured between the locking nut and the clamp body.

The clamp body can include one or more secondary mounting holes for receiving an externally threaded component, wherein the service component is attached to the beam clamp by the externally threaded component.

Alternatively, the beam clamp installed on the flange forms a throughway within a part of the transverse opening, the throughway being bounded by the flange, the clamp body and the set screw, and wherein the service component can be supported or braced by a wire rope that is looped through the throughway.

There is also provided a mounting assembly for attachment to a flange of a structural building member and from which to support or brace a service component, the mounting assembly comprising:
a plurality of clamping members that each have:
a clamp body that includes:
a first jaw section that includes at least one mounting through hole,
at least one second jaw section,
a joining section that interconnects the first and second jaw sections, and
a transverse opening that is to receive the flange, the transverse opening being defined by the first and second jaw sections and the joining section, and
a contact surface on the at least one second jaw section, wherein in use of the mounting assembly, the contact surface is in contact with the flange of the structural member, and wherein the contact surface is formed with surface irregularities providing a roughness that enhances engagement of the contact surface with the flange, and
at least one set screw that is to be installed in the mounting through hole; and
an interconnecting member that is configured to interconnect with the clamping members, and that includes one or more mounting points from which to mount an attachment component,
whereby, in use of the mounting assembly:
each clamping member is secured to the structural member by securing the flange within the transverse opening between the tip of the at least one set screw and the contact surface,
the interconnecting member is secured to the clamping members such that the clamping members are interconnect by the interconnecting member, and
the service component is supported or braced by an attachment component that mounts to at least one of the mounting points.

In some embodiments, the interconnecting member is a connecting plate that has a plurality of primary apertures, and the mounting assembly further comprises a plurality of fasteners,
whereby, in use of the mounting assembly the connecting plate is mounted adjacent the clamping members with the shanks of the set screws extending through the primary apertures, and with the fasteners securing the connecting plate to the clamping members.

In some embodiments:
the mounting assembly has two or more clamping members, and
the connecting plate has two or more primary apertures, the centres of the apertures arranged linearly such that the mounting assembly is mountable along a single edge of a flange of the structural member.

In some alternative embodiments:
the mounting assembly has three or more clamping members, and
the connecting plate has three or more primary apertures, and the centres of the apertures are positioned at the vertices of a notional polygon, wherein the mounting assembly is mountable on two spaced apart edges of a flange of the structural member. Preferably, the mounting points are positioned inwardly of the edges of the notional polygon.

In at least some preferred embodiments, the mounting assembly has four clamping members, and the connecting plate has four primary apertures, and the centres of the apertures are positioned at the vertices of a notional quadrilateral. In such embodiments, the structural member can be an I-beam, and the mounting assembly is mountable on one of the two flanges of the I-beam.

In some embodiments, the interconnecting member includes an elongate member that extends through throughways formed in the clamp bodies.

The clamp body of each clamping member can have any one or more of the features, characteristics and/or properties in accordance with clamp body of the beam clamp as described herein.

Alternatively or additionally, the set screws of each clamping member can have any one or more of the features, characteristics and/or properties in accordance with set screw of the beam clamp as described herein.

BRIEF DESCRIPTION OF THE DRAWINGS

In order that the invention may be more easily understood, embodiments will now be described, by way of example only, with reference to the accompanying drawings, in which:

FIG. 6: is a side elevation of the beam clamp of FIG. 1 installed on a flange of a structural member, together with a bracket and wire rope for supporting/bracing a service component;

FIGS. 15 to 18: are lower perspective views of clamp bodies of variants of the beam clamp shown in FIG. 1;

FIGS. 19 to 22: are upper perspective views of clamp bodies of further variants of the beam clamp shown in FIG. 1;

FIG. 26: is a perspective view of a beam clamp according to a third embodiment of the present invention;

FIG. 27: is an exploded view of the mounting assembly shown in FIG. 26;

FIG. 37: is an exploded view of the mounting assembly shown in FIG. 36.

DETAILED DESCRIPTION

Figure 1:
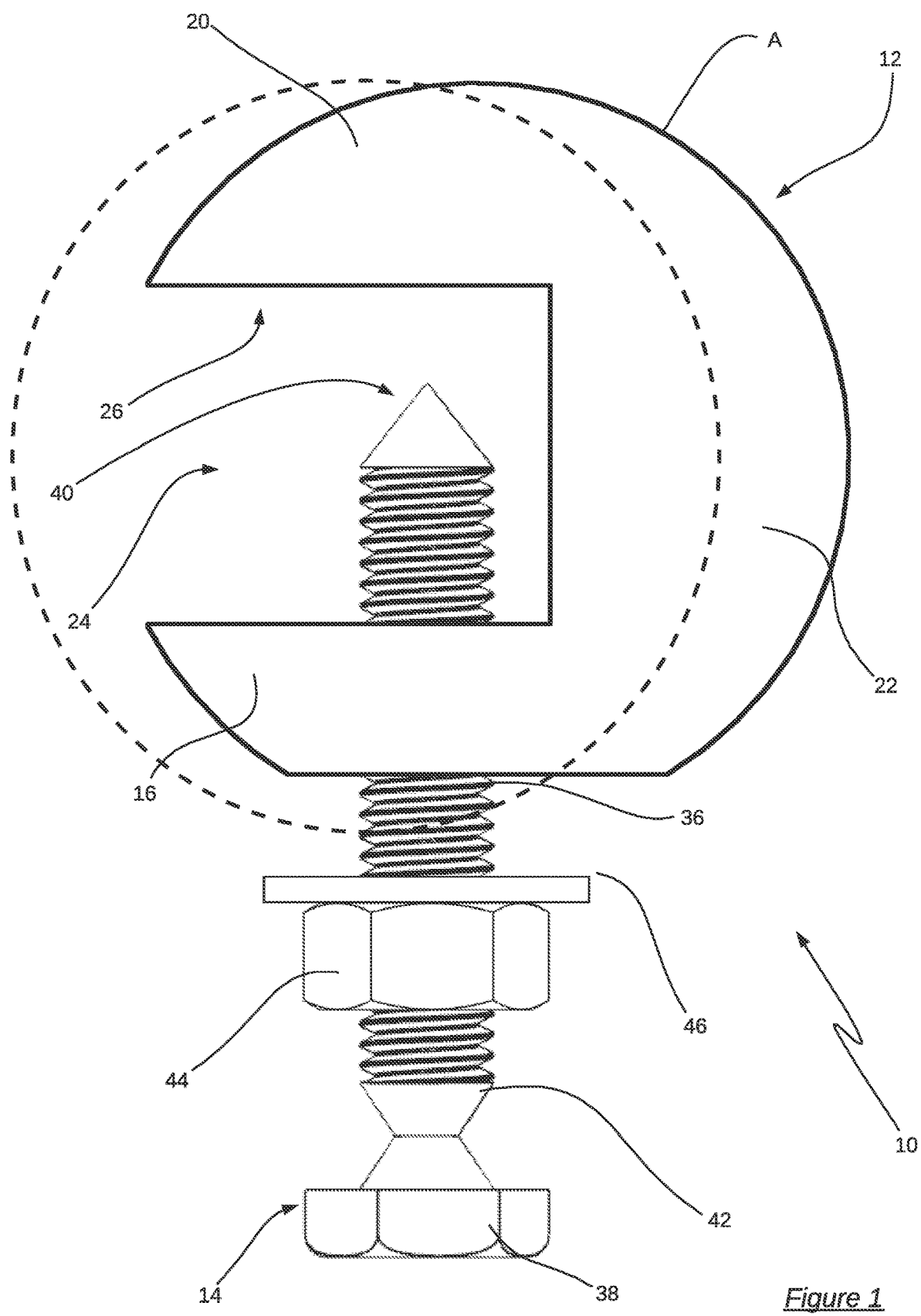
FIG. 1: is a left side view of a beam clamp according to a first embodiment of the present invention.

FIGS. 1 to 6 show a beam 10 according to a first embodiment. The beam clamp 10 is intended for attachment to a flange of a structural building member and from which to support a service component.

The beam clamp 10 includes a clamp body 12 and a set screw 14. As particularly shown in FIGS. 1 and 4, the clamp body 12 includes a first jaw section 16 with a mounting through hole 18 (shown in FIG. 4), a second jaw section 20, and a joining section 22 that interconnects the first and second jaw sections 16, 20.

A transverse opening 24 is defined by the first and second jaw sections 16, 20 and the joining section 22. In use of the beam clamp 10, the flange of the structural component is located within the transverse opening 24. Further, in use of the beam clamp 10, the set screw 14 is installed in the mounting through hole 18, which extends through the first jaw section 16.

As shown in FIG. 6, the flange F is secured within transverse opening 24 between the tip of the set screw 14 and the second jaw section 20. More specifically, the second jaw section 20 has a contact surface 26 that, in use of the beam clamp 10, is in contact with the flange F of the structural member. As shown particularly in FIGS. 3 and 3a, the contact surface 26 is formed with surface irregularities that providing a roughness, which enhances engagement of the contact surface 26 with the flange F.

When the beam clamp 10 is installed on the flange F, the surface irregularities on the contact surface 26 can create a mechanical interference between the second jaw section 20 and the flange F that inhibits movement of the clamp body 12 relative to the flange F.

In at least some embodiments, the clamp body 12 is made of a material that is selected to have a hardness that exceeds the hardness of the structural member. In this way, with a sufficiently high pressure against the opposing surfaces of the flange F, the contact surface 26 deforms the material of the structural member, which enhances engagement of the clamp body 12 with the flange F. This provides the beneficial effect of decreasing the likelihood of the beam clamp 10 slipping from the flange F in service.

By way of example only, the beam clamp 10 can be intended for use with structural members made of medium strength structural steel with a nominal yield strength of 300 MPa, and a typical hardness in the range of 130 to 170 BHN. In such an example, the clamp body 12 may be made of a steel with a nominal hardness of 235 BHN, and with a guaranteed minimum of 200 BHN.

By virtue of the surface irregularities, the total surface area of the contact surface 20 on the second jaw section 20 is greater than the planar surface area defined by the peripheral edges of the contact surface 20.

Figure 3:
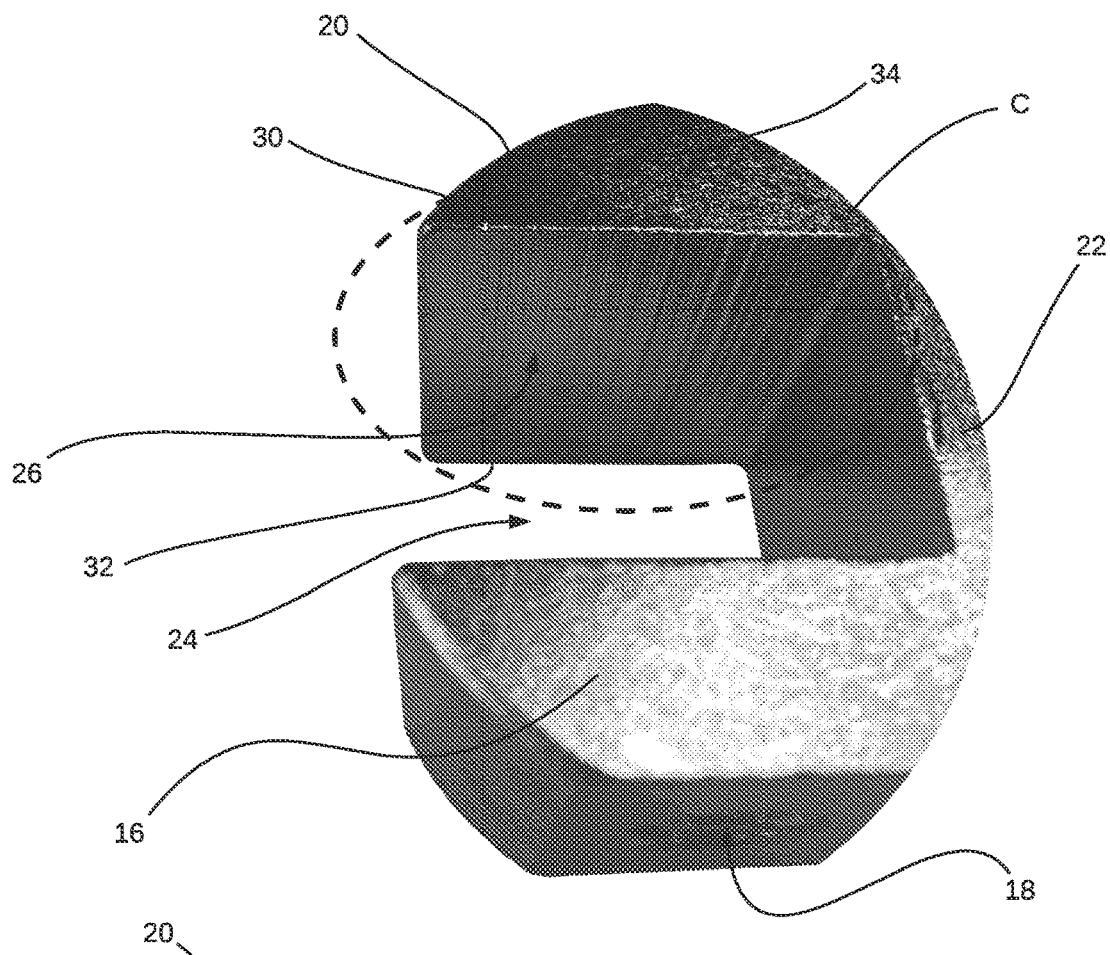
FIG. 3: is a partial bottom perspective view of the clamp body of the beam clamp corresponding with Region A in FIG. 1.
Figure 3A:
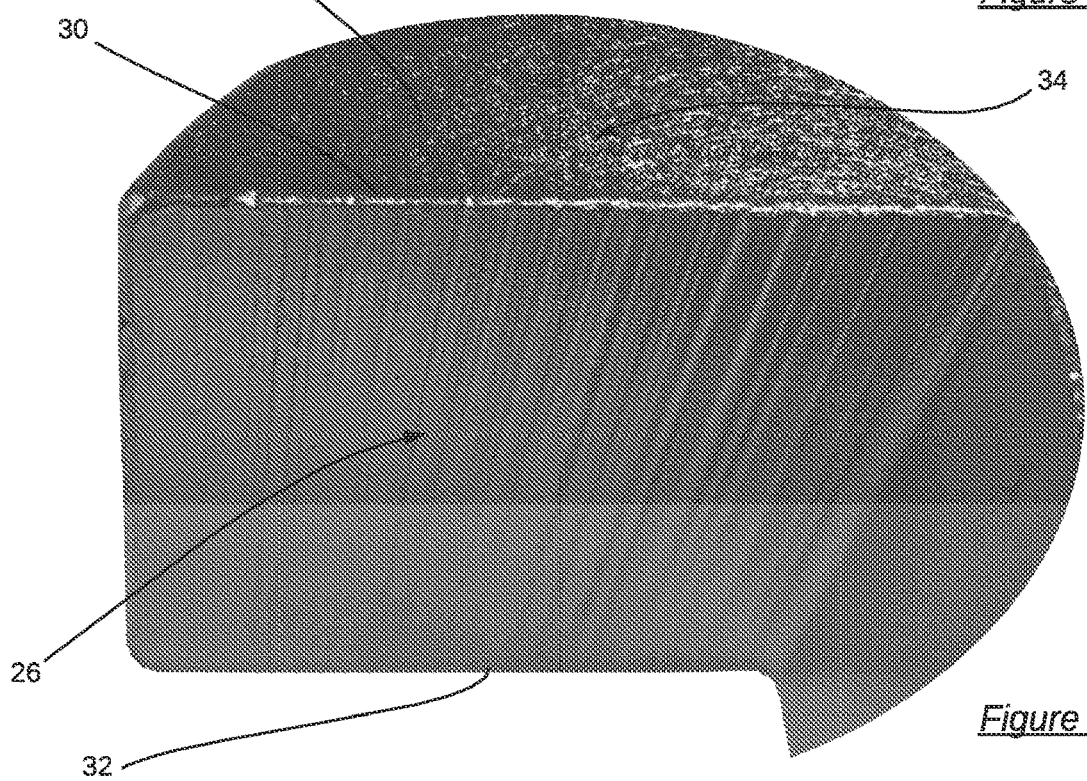
FIG. 3a: is an enlarged view of Region C in FIG. 3.

As shown in FIGS. 3 and 3a, in this embodiment the surface irregularities are in the form of a set of alternating ridges and furrows. In this particular example, the ridges and furrows are substantially parallel to one another, and are formed so as to be substantially transverse to the direction of insertion of the flange F into the transverse opening 24.

Figure 2:
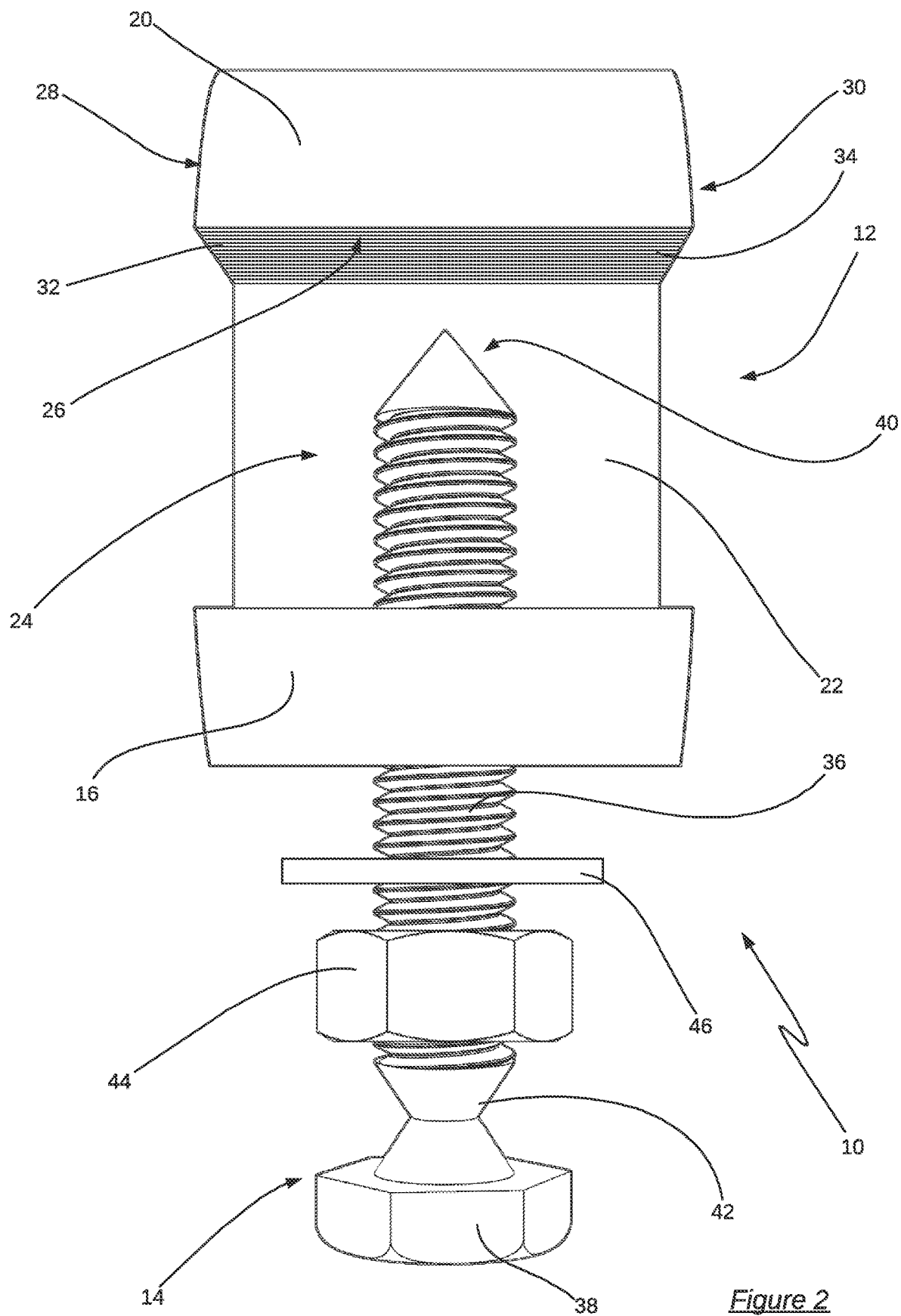
FIG. 2: is a front view of the beam clamp of FIG. 1.

As shown in FIG. 2, the clamp body 12 of this embodiment has a pair of lateral faces 28, 30. The contact surface 26 forms vertices 32, 34 with the lateral faces 28, 30. In this embodiment, the surface irregularities extend the width of the contact surface 26 between the vertices 32, 34. Further, as particularly shown in FIG. 3, the surface irregularities are provided from the leading edge of the second jaw section 20 through the full depth of the contact surface 26. In this way, the entire contact surface 26 is provided with the surface irregularities.

In the illustrated example, the ridges and furrows of the contact surface 26 are substantially linear, and also parallel.

Figure 4:
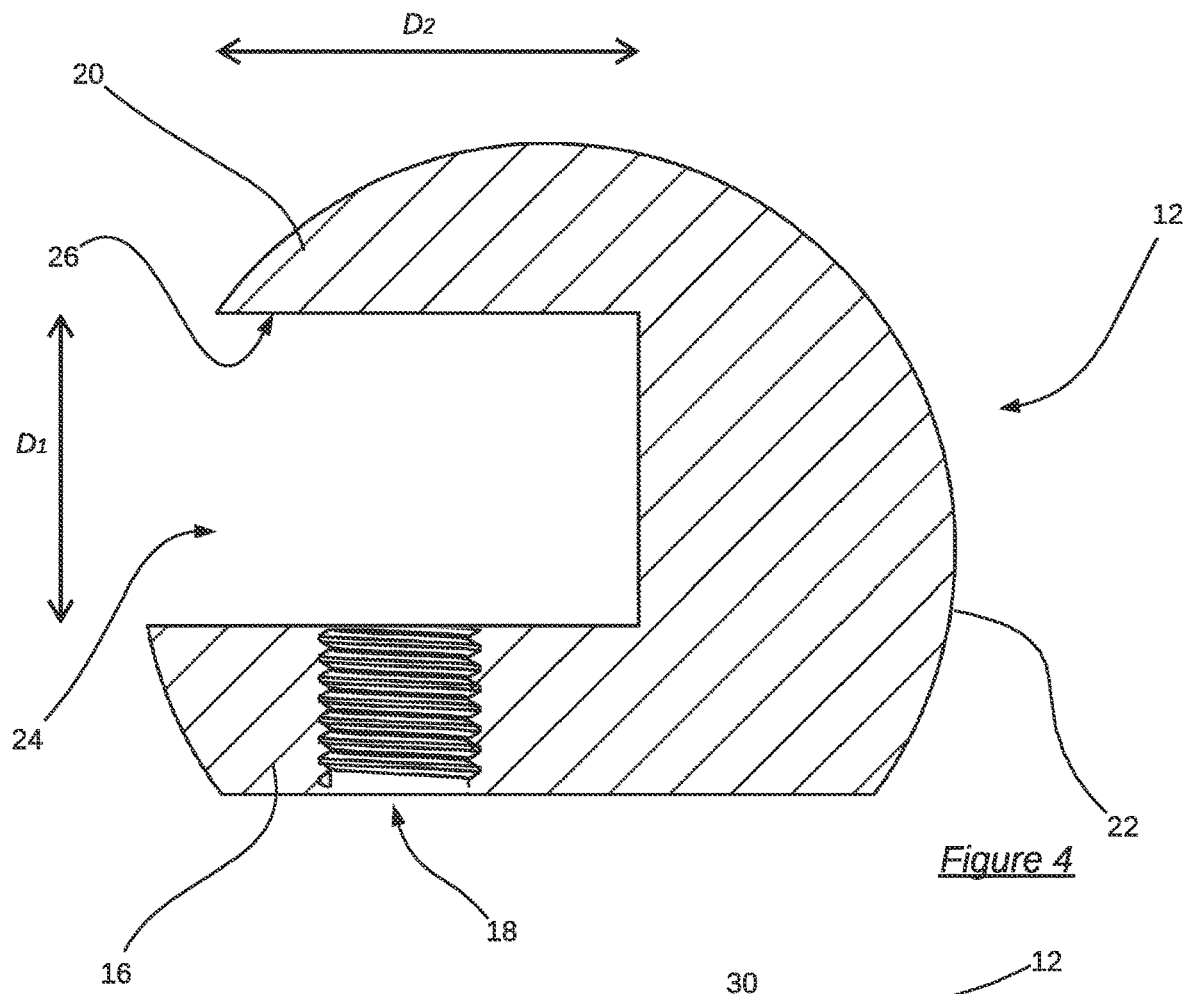
FIG. 4: is a vertical section through the clamp body of the beam clamp of FIG. 1.
Figure 5:
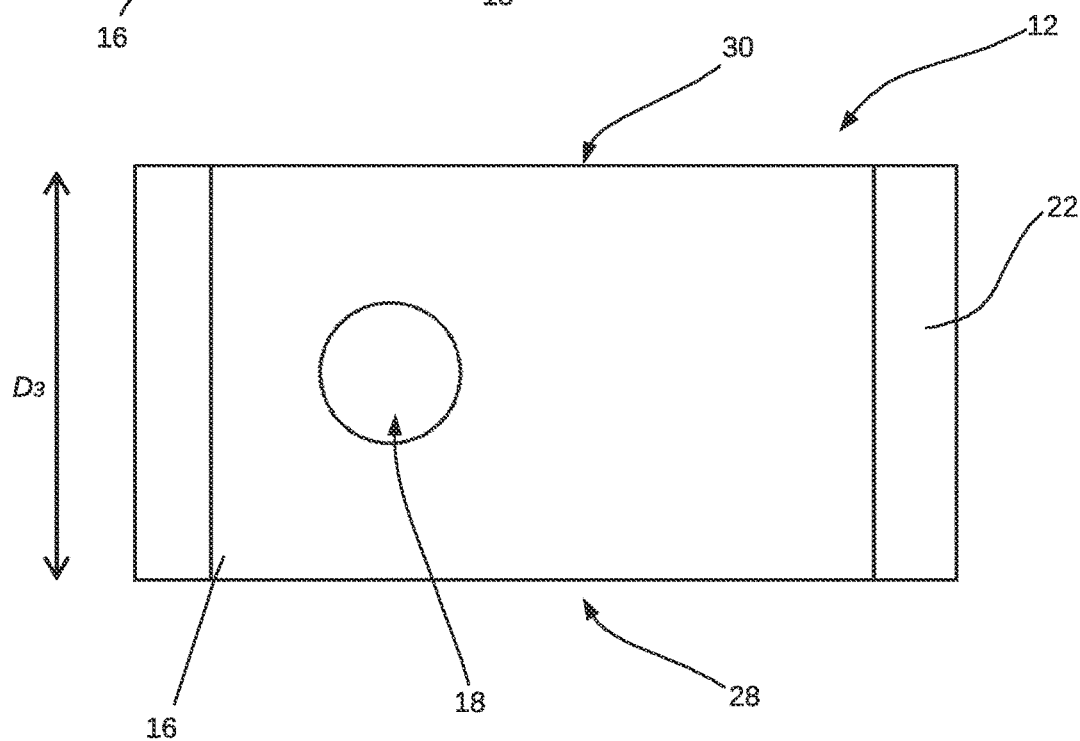
FIG. 5: is a bottom view of the clamp body of the beam clamp of FIG. 1.

FIG. 4 indicates the minimum separation of the first and second jaw sections 16, 20 with double-headed arrow $D_1$, and the depth of the second jaw section 20 with double-headed arrow $D_2$. FIG. 5 indicates the width of the second jaw section 20 between the pair of lateral faces 28, 30 with double-headed arrow $D_3$.

In this particular example, the ratio of the width $D_3$ of the second jaw section 20 (between the pair of lateral faces 28, 30) to the minimum separation $D_1$ of the first and second jaw sections 16, 20 (that is; $D_3:D_1$) is approximately 1.33:1. The ratio of the depth $D_2$ of the second jaw section 20 to the minimum separation $D_1$ of the first and second jaw sections 16, 20 (that is; $D_2:D_1$) is approximately 1.6:1.

Preferably, the average amplitude of the surface irregularities is less than 1 mm (millimetre). More preferably, the average amplitude of the surface irregularities is between 2 μm (micrometre) and 100 μm. For the purposes of this specification, the amplitude of the surface irregularities will be understood to me the geometric separation of adjacent peak and trough formations of the surface irregularities, measured in a direction that is orthogonal to a common plane of the contact surface 26. It will be appreciated that there may be variation in the amplitude of the surface irregularities.

In this embodiment, the surface irregularities are created by a cutting tool that is used to form the transverse opening 24 in the clamp body 12.

As shown most clearly in FIGS. 1 and 2, the set screw 14 has a shank 36, a head 38 with which to rotate the set screw 14 during installation, and a tip 40. The shank 36 includes a waisted formation 42 that acts as a stress concentrator. When a predetermined torque is applied to the shank 36, the shank 36 shears within the waisted formation 42, breaking the head 38 from the externally threaded portion of the shank 36. This provides the advantage of establishing a predetermined pressure of the tip 40 of the set screw 14 against the flange F, without having to set the torque or measure the pressure/material stresses.

In the example of FIGS. 1 and 2, the waisted formation 42 is adjacent the head 38 of the set screw 14. Further, the waisted formation 42 is between the head 38 and the externally threaded portion of the shank 36. As will be apparent from FIG. 6, the narrowest diameter of the waisted portion 42 is less than the minor diameter of the external thread on the shank 36.

The waisted formation 42 is shaped so as to have a first portion that is a convergent conical frustum, and a second portion that is a divergent conical frustum. The tip 40 of the set screw 14 tapers so as to narrow in a direction away from the head 38 of the set screw to a point. Accordingly, the taper of the tip 40 is also in a direction away from the waisted formation 42.

The beam clamp 10 includes a locking nut 44 and washer 46 that locate on the shank 36, externally of the transverse opening 24. In the example of FIG. 6, a service component (not shown) is connected to one end of a wire rope R. An angle bracket B is connected to the opposing end of the wire rope R. The bracket B is captured between the washer and locking nut pair 44, 46, and the clamp body 12. In this way, the service component is supported by the beam clamp 10.

In the example illustrated in FIG. 6, the bracket B and wire rope R are arranged such that tensile load generated in the wire rope R extends at approximately 45° in a direction that is downward and outward with respect to the contact surface 26 and first and second jaw sections 16, 20. In other installations, the service component can be connected to the beam clamp 10 such that the applied loads are:

perpendicular to the contact surface 26 and extend in a direction that is generally away from the transverse opening 24, in a plane that is parallel to the contact surface 24, or at any angle therebetween.

Further, in some instances the beam clamp can be used for supporting/bracing loads that are applied in directions that are upward with respect to the first jaw section 16.

Figure 7:
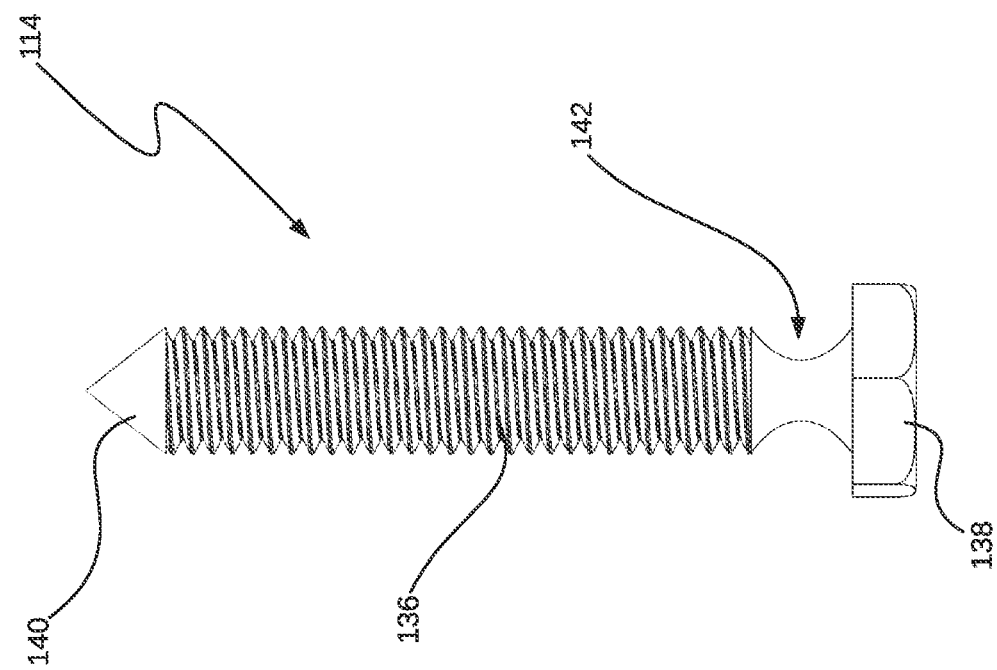
FIG. 7 is a side elevation of the set screw of the beam clamp of a first alternative embodiment.

FIG. 7 shows an alternative set screw 114 that has a shank 136, a head 138 with which to rotate the set screw 114 during installation, and a tip 140. The shank 136 includes a waisted formation 142, which (in this instance) has a one-sheet hyperboloid shape. As with the set screw 14, the narrowest diameter of the waisted portion 144 is less than the minor diameter of the external thread on the shank 136. The tip 140 is tapered to form a pointed tip.

Figure 8:
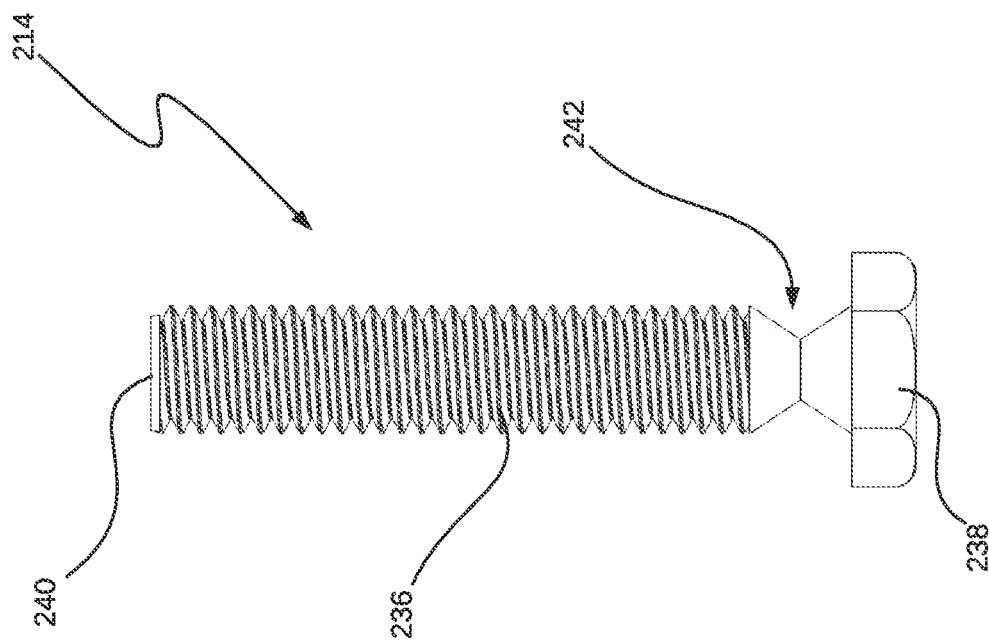
FIG. 8: is a side elevation of a set screw that is part of a beam clamp of a second alternative embodiment.

FIG. 8 shows another alternative set screw 214 that has a shank 236, a head 238 with which to rotate the set screw 214 during installation, and a tip 240. The shank 236 includes a waisted formation 242, which (in this instance) has a first portion that is a convergent conical frustum, and a second portion that is a divergent conical frustum. As with the set screw 14, the narrowest diameter of the waisted portion 244 is less than the minor diameter of the external thread on the shank 236. Differing from the set screws 14, 114, the tip 240 of the set screw 214 is blunt.

Figure 9:
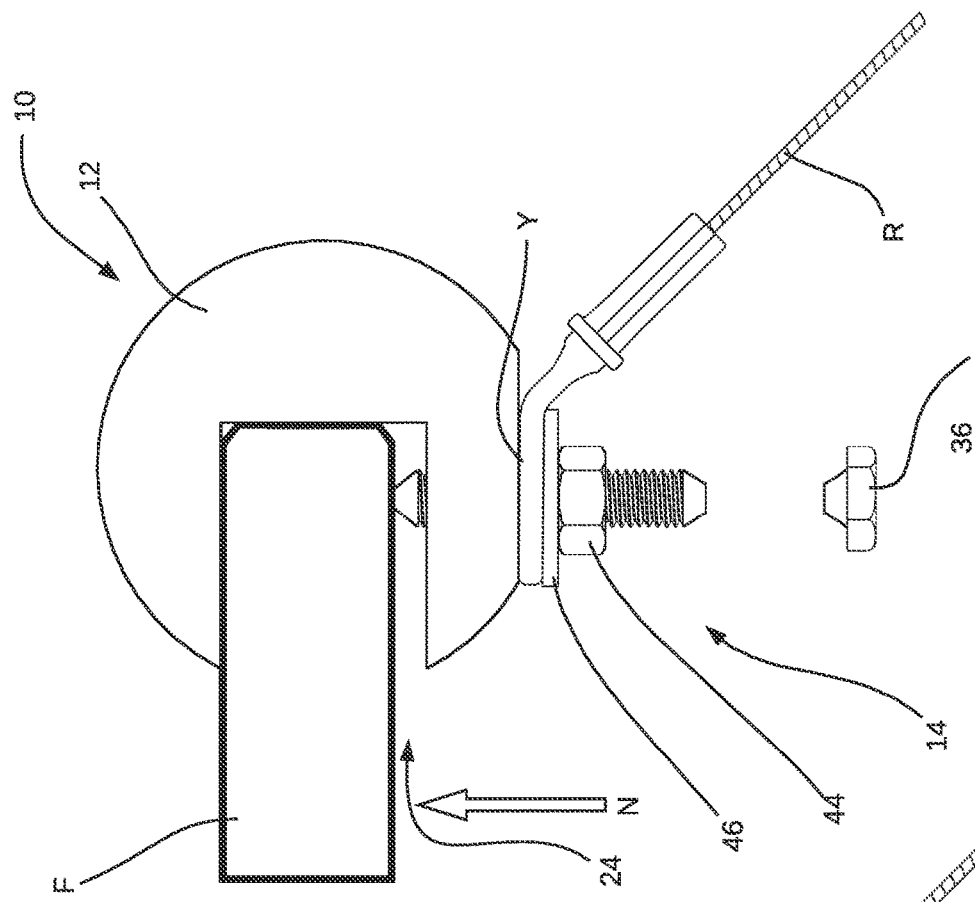
FIGS. 9 and 10: are schematic side elevations illustrating a first method of installing a beam clamp on a flange for supporting a service component with an eyelet and wire rope.
Figure 10:
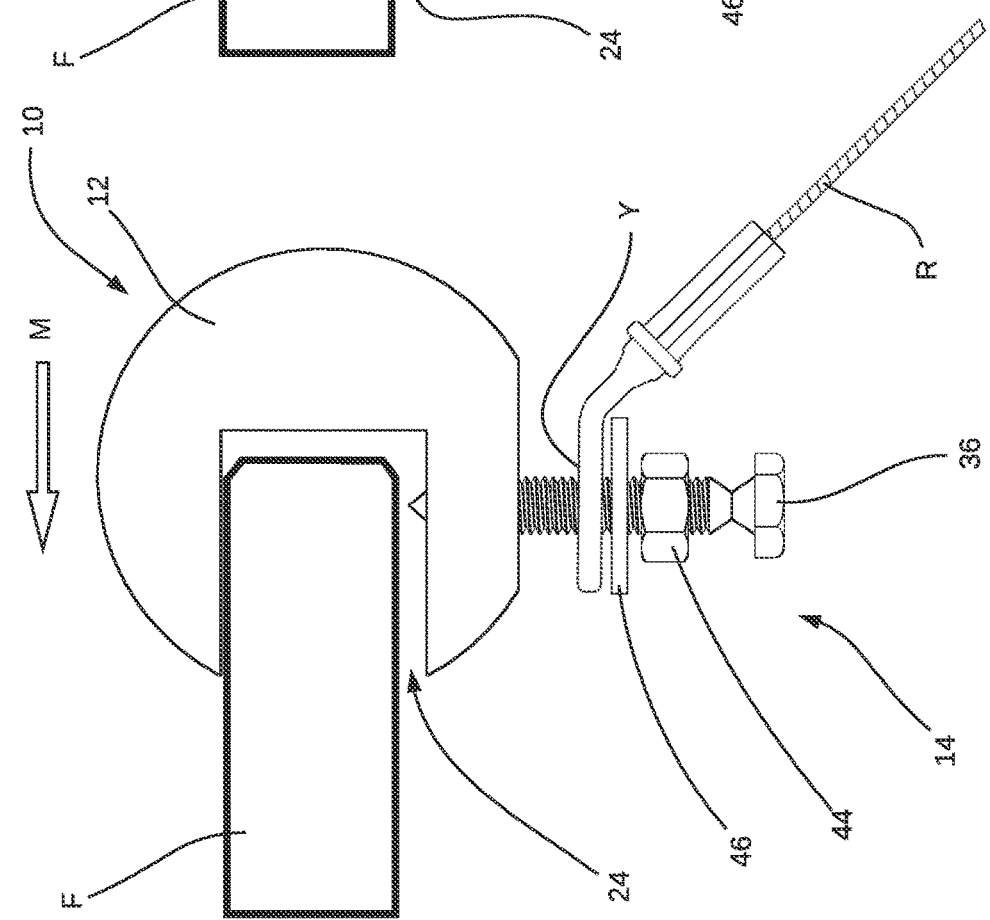

FIGS. 9 and 10 illustrate steps of a first method of installing the beam clamp 10 illustrated in FIG. 1 on a flange F. In this example, an eyelet Y is connected to one end of a wire rope R, and a service component (not shown) is connected (or is to be connected) to the opposing end of the wire rope R.

As indicated in FIG. 9, the beam clamp 10 is partially assembled with the locking nut and washer pair 44, 46 and eyelet Y on the set screw 14, and with the set screw 14 partially inserted into the mounting through hole 18. The clamp body 12 is then located on the flange F, as indicated by arrow M.

As indicated in FIG. 10, the flange F is located to the full depth of the transverse opening 24. The set screw 14 is further inserted through the mounting through hole 18 (as indicated by arrow N) such that the tip 40 engages the lower surface of the flange F, and the upper surface of the flange F is hard against the contact surface 26. The set screw 14 is tensioned until the head 38 shears from the shank 36, as shown in FIG. 10. The locking nut 44 can then be tightened to capture the eyelet Y between the locking nut and washer pair 44, 46 and the clamp body 12.

Figure 13:
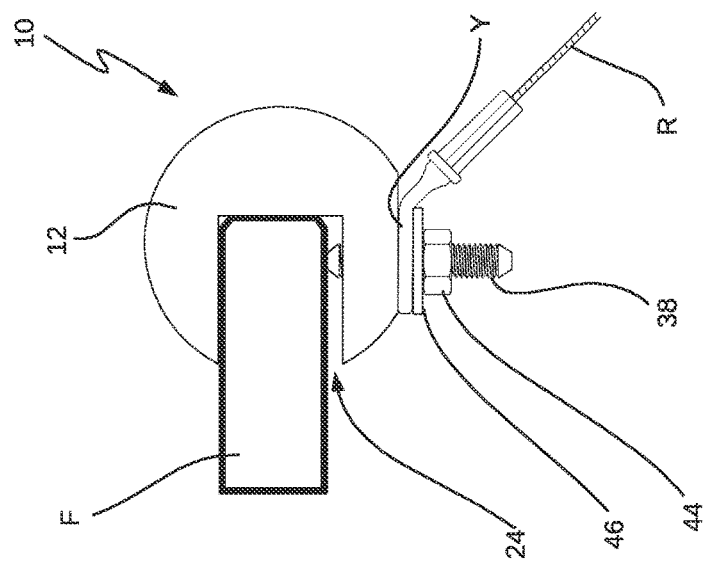
FIGS. 11 to 13: are schematic side elevations illustrating a second method of installing a beam clamp on a flange for supporting a service component with an eyelet and wire rope.
Figure 12:
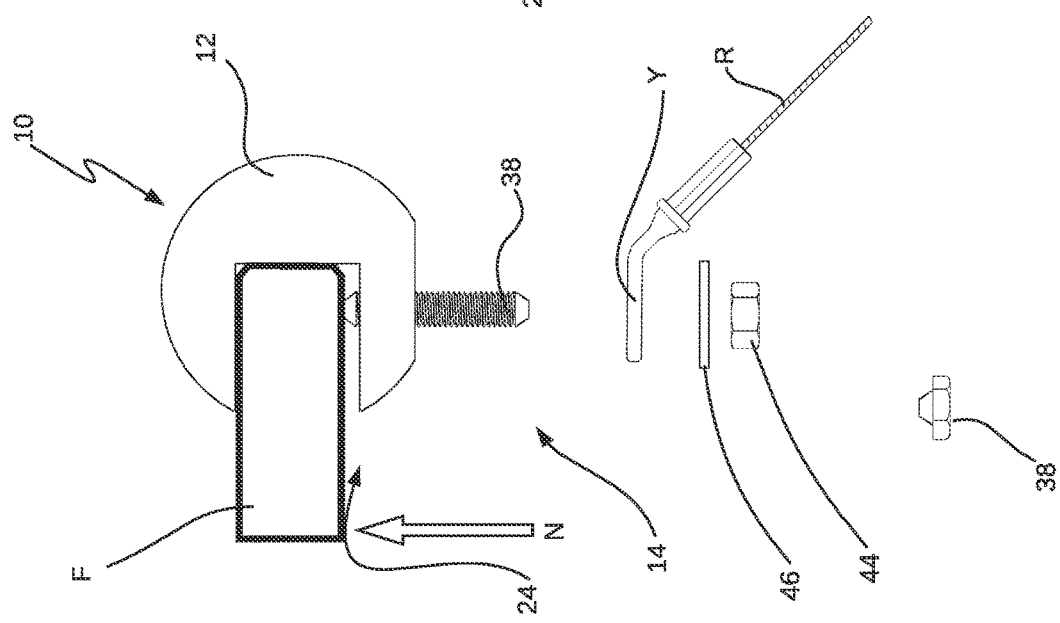
Figure 11:
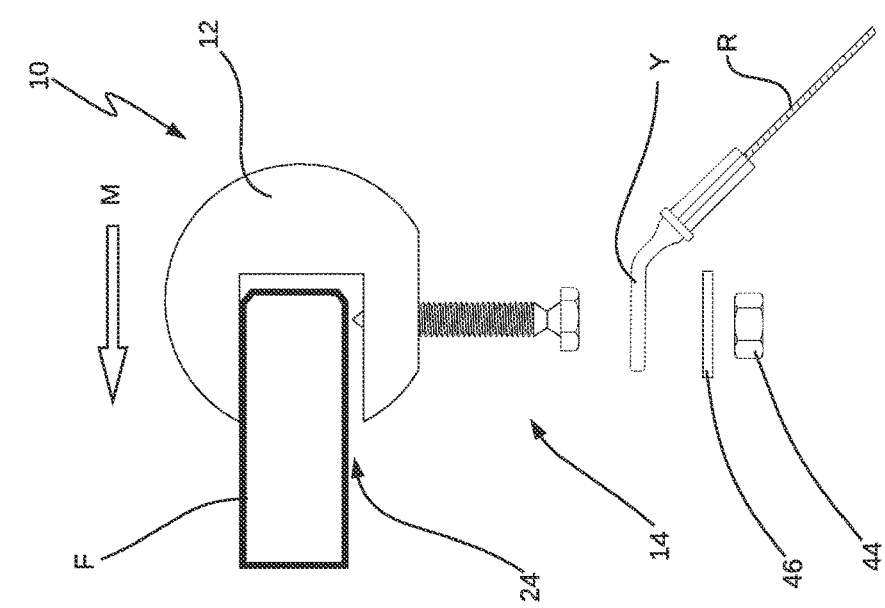

FIGS. 11 to 13 illustrate steps of a second method of installing the beam clamp 10 illustrated in FIG. 1 on a flange F. In this example, an eyelet Y is connected to one end of a wire rope R, and a service component (not shown) is connected (or is to be connected) to the opposing end of the wire rope R.

As indicated in FIG. 11, the beam clamp 10 is partially assembled with the set screw 14 partially inserted into the mounting through hole 18. However, at this stage of this particular method, the locking nut and washer pair 44, 46 and eyelet Y are not installed on the set screw 14. The clamp body 12 is then located on the flange F, as indicated by arrow M.

As indicated in FIG. 12, the flange F is located to the full depth of the transverse opening 24. The set screw 14 is further inserted through the mounting through hole 18 (as indicated by arrow N) such that the tip 40 engages the lower surface of the flange F, and the upper surface of the flange F is hard against the contact surface 26. The set screw 14 is tensioned until the head 38 shears from the shank 36, as shown in FIG. 12.

As indicated in FIG. 13, the eyelet Y, and then the locking nut and washer pair 44, 46 are installed on the exposed part of the shank 36. The locking nut 44 can then be tightened to capture the eyelet Y between the locking nut and washer pair 44, 46 and the clamp body 12.

As will be appreciated, the beam clamp 10 when installed by either the first or second described method can have the advantage of enabling the eyelet Y to be removed and replaced/reinstalled without interfering with clamping force of the clamping body 12 and set screw 14 on the flange F.

Figure 14:
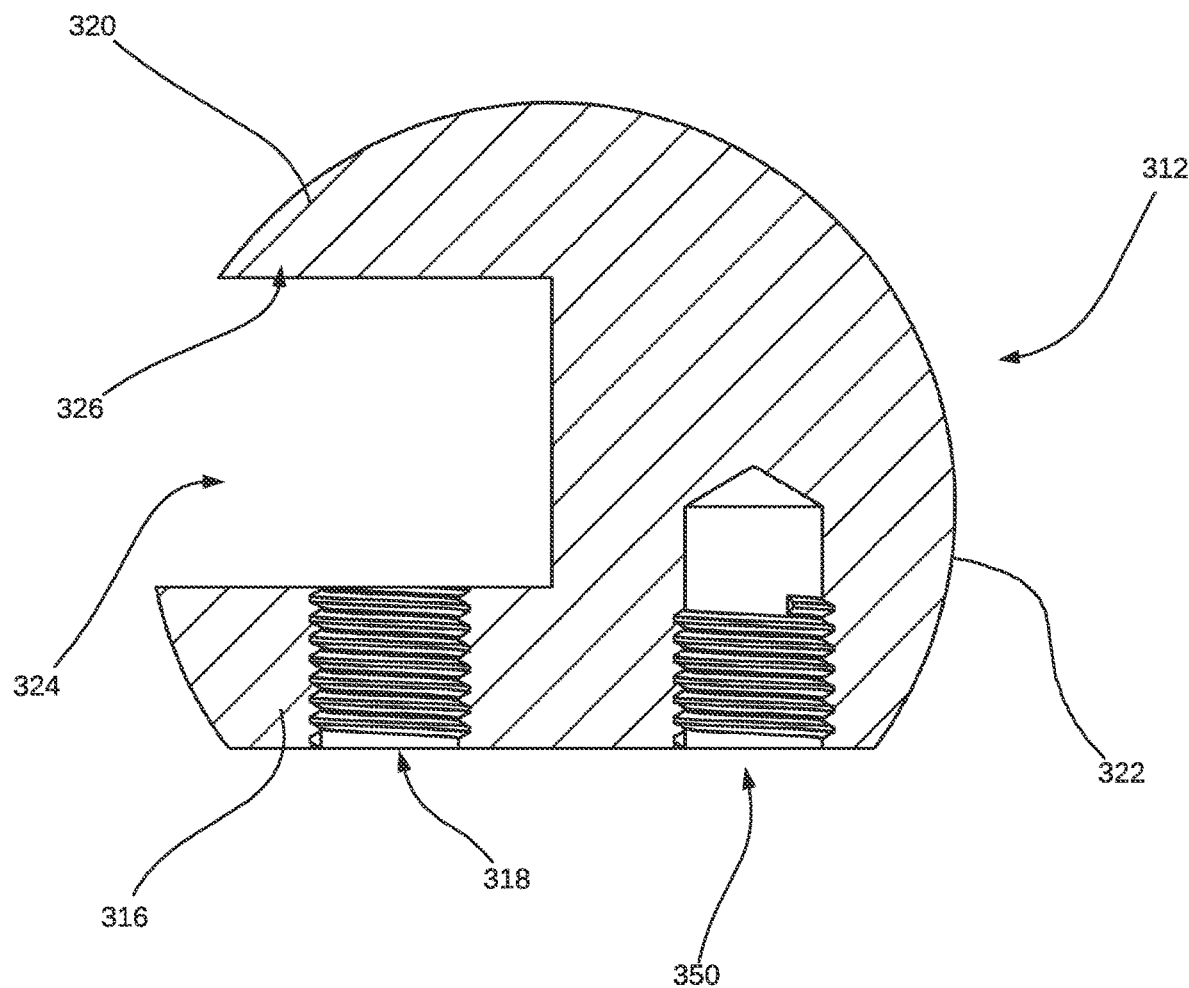
FIG. 14: is a vertical section through the clamp body of a beam clamp of a second embodiment.

FIG. 14 shows a vertical cross section through a clamp body 312 of a beam clamp according to a second embodiment. The clamp body 312 includes a first jaw section 316 with a mounting through hole 318, a second jaw section 320, and a joining section 322 that interconnects the first and second jaw sections 316, 320.

A transverse opening 324 is defined by the first and second jaw sections 316, 320 and the joining section 322. In use of a beam clamp that includes the clamp body 312, the flange of the structural component is located within the transverse opening 324. Further, in use of the beam clamp 310, the set screw 14 is installed in the mounting through hole 318, which extends through the first jaw section 316.

In this embodiment, the clamp body 312 includes a mounting point, which in this embodiment is in the form of a secondary mounting hole 350 for receiving an externally threaded component. In this particular example, the secondary mounting hole 350 is a blind hole that is formed in the joining section 322. The service component is attached to the beam clamp by the externally threaded component. As will be appreciated, in this example, the externally threaded component can be a screw, or may be a threaded rod.

In the embodiments illustrated in FIGS. 6, and 9 to 13, the beam clamps are configured so that a service component is supported and/or braced by a component that is secured to the clamp body using the set screw (and in the example of FIG. 14 alternatively or additionally using another externally threaded component). As will be appreciated from FIG. 6, a throughway is created when the beam clamp 10 is installed on the flange F, the throughway being formed within the deepest part of the transverse opening 24, and being bounded by the flange F, the clamp body 12 and the set screw 14. In some instances, it may be desirable and suitable for the service component to be supported and/or braced by a wire rope that is looped through the throughway. For example, the wire rope can pass through the throughway, with the bitter end swaged back on the wire rope itself.

FIGS. 15 to 18 respectively illustrate schematically clamp bodies 12a, 12b, 12c, 12d of variants of the beam clamp shown in FIG. 1, which differ in the particular form of the surface irregularities that are formed in the contact surface.

The surface irregularities formed on the contact surface 26a of the clamp body 12a illustrated in FIG. 15 are a set of alternating ridges and furrows that are substantially parallel to one another, and are formed so as to be oblique to the direction of insertion of the flange F into the transverse opening 24a.

The surface irregularities formed on the contact surface 26b of the clamp body 12b illustrated in FIG. 16 are a set of alternating ridges and furrows that are each chevron shaped, when viewed in a direction normal to the contact surface 26b. Thus, the alternating ridges and furrows form a series of chevrons across the contact surface 26b.

The surface irregularities formed on the contact surface 26c of the clamp body 12c illustrated in FIG. 17 are a set of alternating ridges and furrows that are substantially parallel to one another, and are formed so as to be parallel to the direction of insertion of the flange F into the transverse opening 24c.

The surface irregularities formed on the contact surface 26d of the clamp body 12d illustrated in FIG. 18 are a set of alternating ridges and furrows that are substantially arcuate. In this particular example, the alternating ridges and furrows form a series of concentric circles and/or arcs across the surface of the contact surface 26d.

FIGS. 19 to 22 respectively illustrate schematically clamp bodies 12e, 12f, 12g, 12h of further variants of the beam clamp shown in FIG. 1.

The clamp body 12e shown in FIG. 19 has three mounting through holes 18e in the first jaw section 16e. Accordingly, the beam clamp incorporating the clamp body 12e can have up to three set screws (not shown) to use in securing the flange of the structural member within the transverse opening 24e. As will be appreciated, the width of the clamp body 12e between its lateral faces (one of which is visible in FIG. 19) is greater than the width of the clamp body 12 of the embodiment illustrated in FIG. 1. Accordingly, the width of the contact surface 26e between the lateral faces is greater, when compared with the clamp body 12. This enables greater engagement of the contact surface 26e with the flange of the structural member (again, compared with the clamp body 12). Further, the use of up to three set screws can provide increased engagement with the flange.

In the clamp body 12e, the three mounting through holes 18e are arranged in the first jaw section 16e such that the centres of the holes 18e are arranged linearly.

The clamp body 12f shown in FIG. 20 similarly has three mounting holes 18f in the first jaw section 16f. The three mounting holes 18f are arranged in the first jaw section 16f such that the centres of the holes 17f are positioned at the vertices of a notional equilateral triangle. Further, one of the three holes 18f is closer to the joining section 22f of the clamp body 12f than the other two holes 18f.

With respect to the claim bodies 12e, 12f shown in FIGS. 19 and 20, it will be appreciated that a beam clamp using either clamp body 12e, 12f can be installed using fewer set screws than the number of mounting through holes 18e, 18f. Further, in such installations, any mounting through hole that does not have a set screw passing therethrough is available for use as a mounting point.

The clamp body 12g shown in FIG. 21 has a mounting through hole 19 formed in the second jaw section 20g. In addition, the first jaw section 18g includes a contact surface 27 that is substantially similar in form and function to the contact surface 26g on the second jaw section 20g. As will be appreciated, the clamp body 12g can be mounted in either of two orientations on the flange of the structural member and a set screw (not shown) extending through either mounting through hole 18g, 19, depending on which of the two contact surfaces 26g, 27 is to be in contact with the flange.

The clamp body 12g additionally includes a mounting point, which in this embodiment is in the form of an internally threaded through hole 23 that extends through the joining section 22g. The hole 23 is able to receive a component with an external threaded. Accordingly, the hole 23 provides an additional mounting point for use in a securing and/or bracing function for a service component.

The clamp body 12h shown in FIG. 22 includes a mounting point, which in this embodiment is in the form of a transverse through hole 29 that extends through the joining section 12h, and from lateral face 30h. In use of the clamp body 12h in a beam lamp, an elongate element (such as a wire rope, rod, threaded rod, fastener, etc.) can be passed through the transverse through hole 29 for use in a securing and/or bracing function for a service component.

Figure 25:
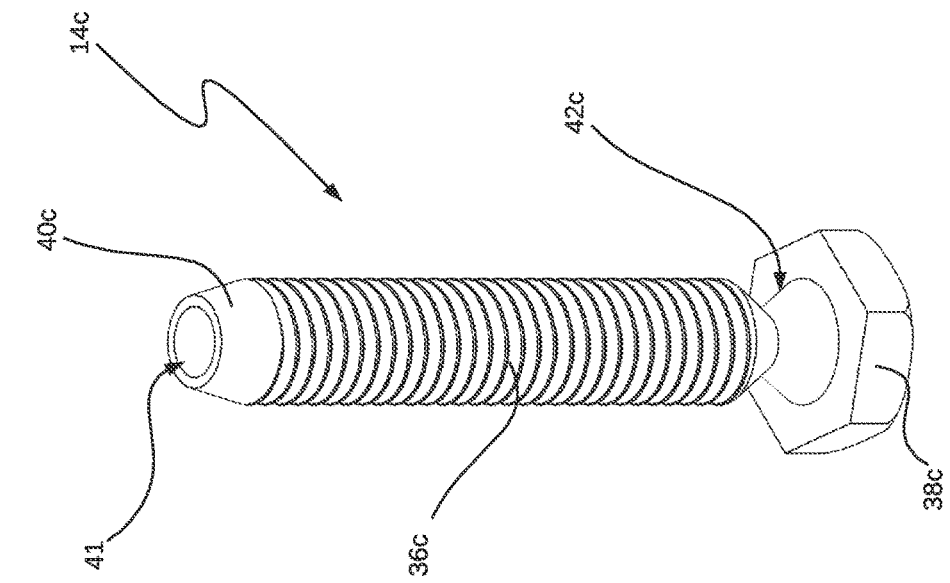
FIGS. 23 to 25: are upper perspective views of set screws of variants of the beam clamp shown in FIG. 1.
Figure 24:
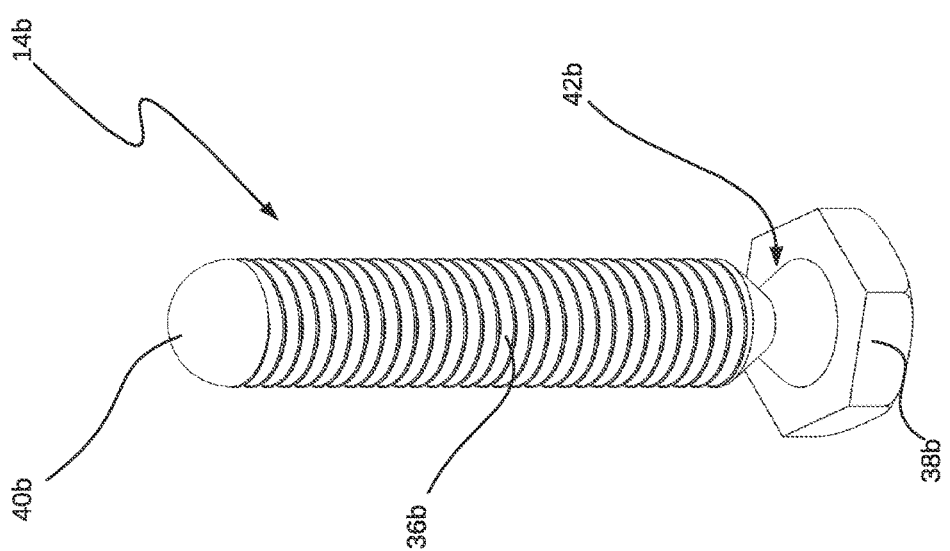
Figure 23:
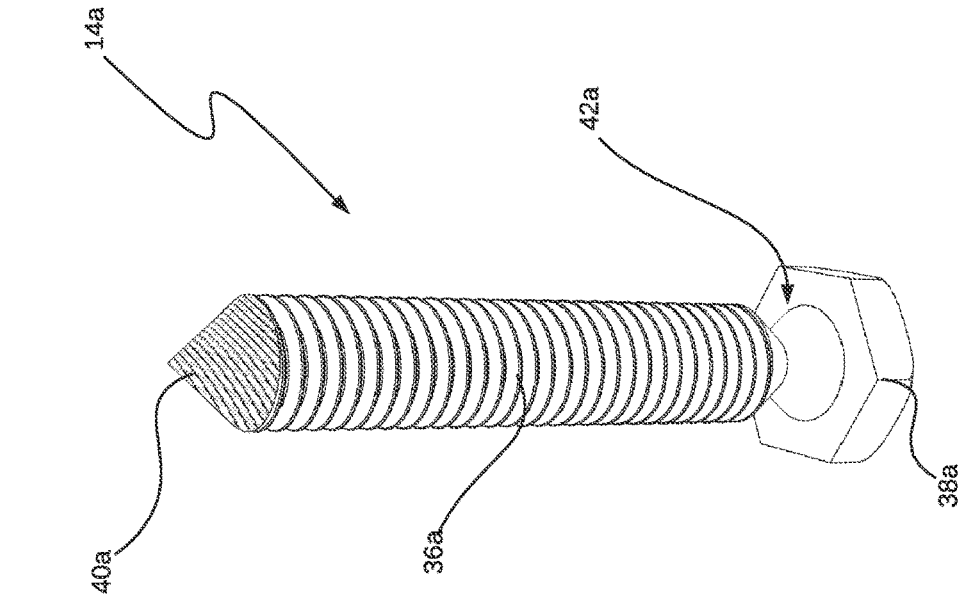
Figure 28:
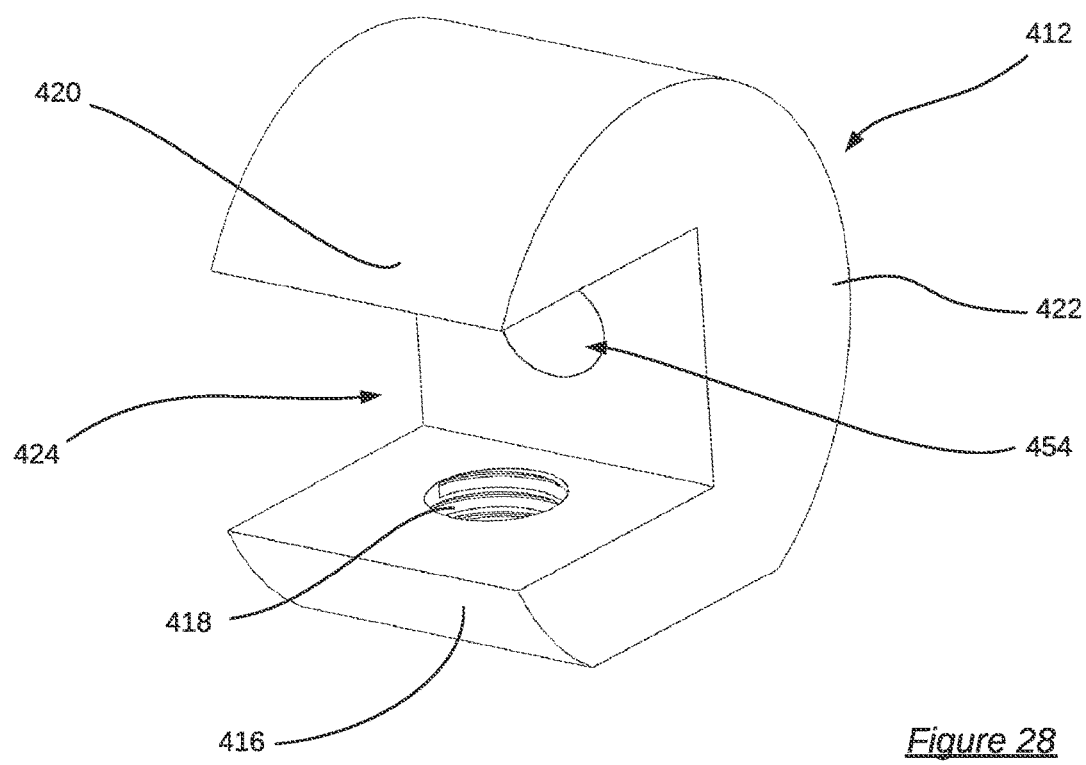
FIG. 28: is a front perspective view of the clamping member of the mounting assembly shown in FIG. 26.
Figure 29:
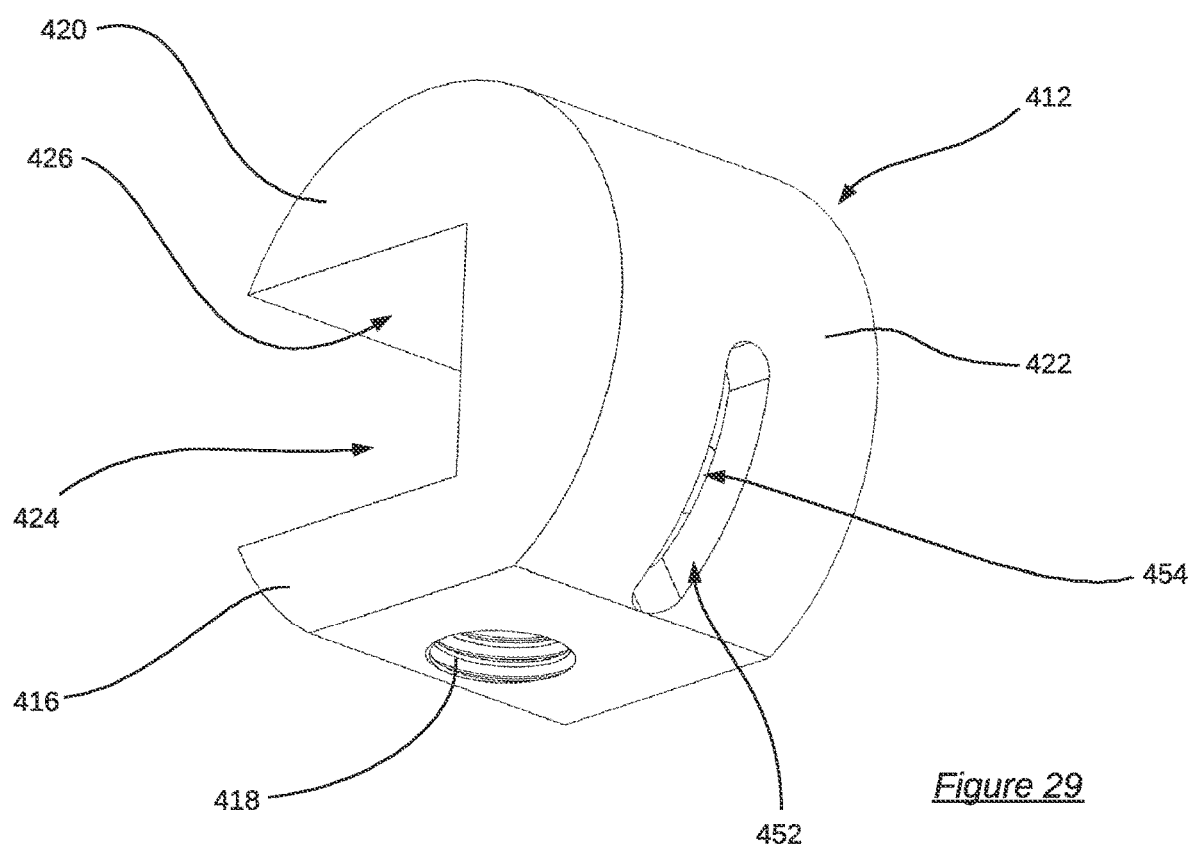
FIG. 29: is a rear perspective view of the clamping member of FIG. 28.

FIGS. 23 to 25 respectively illustrate schematically set screws 14a, 14b, 14c suitable for use in beam clamps according to embodiments.

The set screw 14a illustrated in FIG. 23 includes surface irregularities formed in the external surface of the tip 40a. The surface irregularities provide a roughness that enhances engagement of the set screw 14a with the flange of the structural member.

The set screw 14b illustrated in FIG. 24 has a tip 40b that has a general dome shape. As will be appreciated from FIG. 24, the tip 40b tapers so as to narrow in a direction away from the head 38b of the set screw 14b. In addition, the leading end of the tip 40b has a cross sectional area that is less than the cross sectional area of the shank 36b (with both cross sections being in planes that are transverse to the longitudinal direction of the set screw).

The set screw 14c illustrated in FIG. 25 has a tip 40c that includes a concave formation 41. Consequently, the end of the tip 40c defines an annulus that extends around the concave formation 41. By virtue of the tapered external surface of the tip 40c and the concave formation 41, the leading end of the tip 40c has a cross sectional area that is less than the cross sectional area of the shank 36c.

In one further variant of the set screw, the tip can include an annular concave formation, with a central conical formation and an annular ring surrounding the annular concave formation. The annular ring can taper in a direction away from the head of the set screw. Alternatively or additionally, the leading end of the central conical formation can project longitudinally beyond the leading edge of the annular ring.

Embodiments may incorporate one or more set screws that have different tip forms and/or features from those illustrated. By way of example, set screws may have features that combine features of set screws illustrated herein.

FIGS. 26 to 29 show a beam clamp 410 according to a third embodiment. Parts of the beam clamp 410 that are the same or similar to parts of the beam clamp 10 have the same reference numbers with the prefix "4", and for succinctness will not be described again.

The clamp body 412 includes a mounting point, which in this embodiment is in the form of a capturing formation 450 that is formed in the joining section 422. As illustrated in FIGS. 26 and 27, the capturing formation 450 is shaped to receive a ferrule formation U on the end of a wire rope R. As will be appreciated, the wire rope R and ferrule formation U form an attachment component is to be connected to the service component, so as to provide support and/or bracing for the service component via the beam clamp 410.

The capturing formation 450 includes a slot 452 that opens onto the external surface of the joining section 422 of the clamp body 214, and an insertion opening 454 that opens onto the transverse opening 424. The insertion opening 454 is dimensioned so as to be larger than the width of the slot 452. In this way, a stepped shoulder is formed internally within the joining section 422 and the intersection of the insertion aperture 454 with the slot 452.

In addition, the insertion opening 454 is dimensioned so as to be larger than the diameter of the ferrule formation U. Thus, the wire rope R can pass through both the insertion opening 454 and the slot 452. The ferrule formation U can pass through the insertion opening 454 but is obstructed by the stepped shoulder from entering the slot 452. Accordingly, the capturing formation 450 captures the ferrule formation U, such that the end of the wire rope R is retained within the clamping body 412.

In this example, the slot 452 is elongate, which enables the wire rope R to extend from the clamping body 412 at a range of angles. It will be appreciated that in some alternative embodiments, the slot 452 could be substituted with a circular hole that intersects the insertion hole 454. Similarly, the insertion opening 454 can be circular, or an elongate slot.

Figure 30:
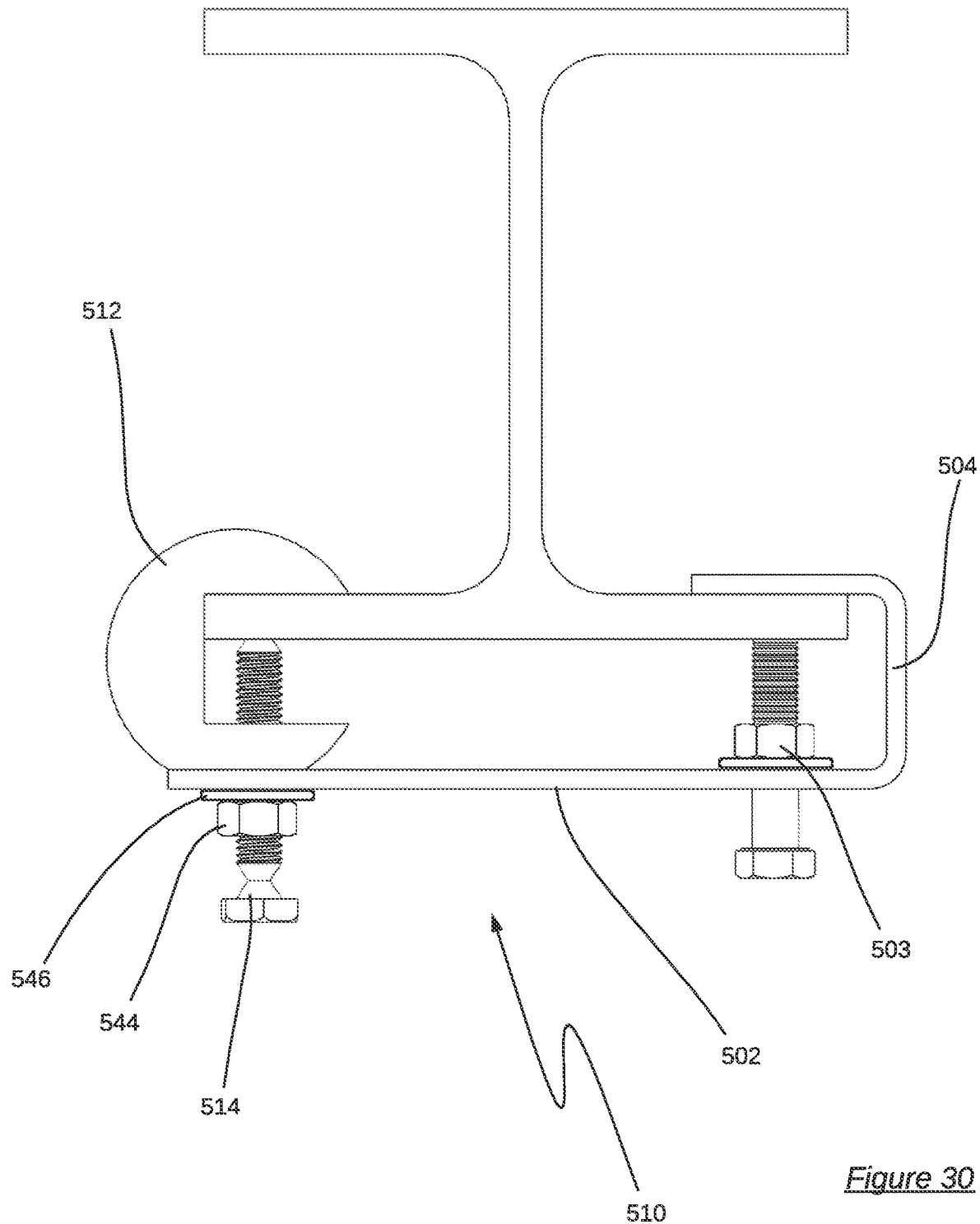
FIG. 30: is a side elevation view of a beam clamp according to a fourth embodiment of the present invention.

FIG. 30 shows a beam clamp 510 according to a fourth embodiment of the present invention. The beam clamp 510 includes a clamp body 512, a set screw 514, and a locking nut 544 and washer 546, all of which are substantially similar to the corresponding components of the beam clamp 10 shown in FIG. 1. Parts of the beam clamp 510 that are the same or similar to parts of the beam clamp 10 have the same reference numbers with the prefix "5", and for succinctness will not be described again.

The beam clamp 510 of this embodiment is particularly suitable for mounting on a flange F of a structural member such as an I-beam (as illustrated in FIG. 30), which has two opposing edges. As shown in FIG. 30, the clamp body 512 is secured to one edge of the flange F by the set screw 514.

The beam clamp 510 also has a load support, which in this particular example includes a hooking member 502. At one end of the hooking member 502 is a hole through which the shank 536 of the set screw 514 extends, and the hooking member 502 is captured between the washer and locking nut pair 544, 546 and the clamp body 512. In this way, the hooking member 502 is connected to the clamp body 512. At the opposing end, the hooking member 502 includes a hook portion 504 that hooks around opposing edge of the flange F.

In the illustrated embodiment, the load support includes, and an optional fastener 503. The fastener 503 extends through another hole in the hooking member 502 that is adjacent hook portion 504. The opposing edge of the flange F is captured between the end of the hook portion 504 and the fastener 503.

Loads applied to the beam clamp 510 are distributed between the clamp body 512 and the hooking member 502. As will be appreciated, the direction of the applied load will dictate the manner in which the load is distributed.

Figure 31:
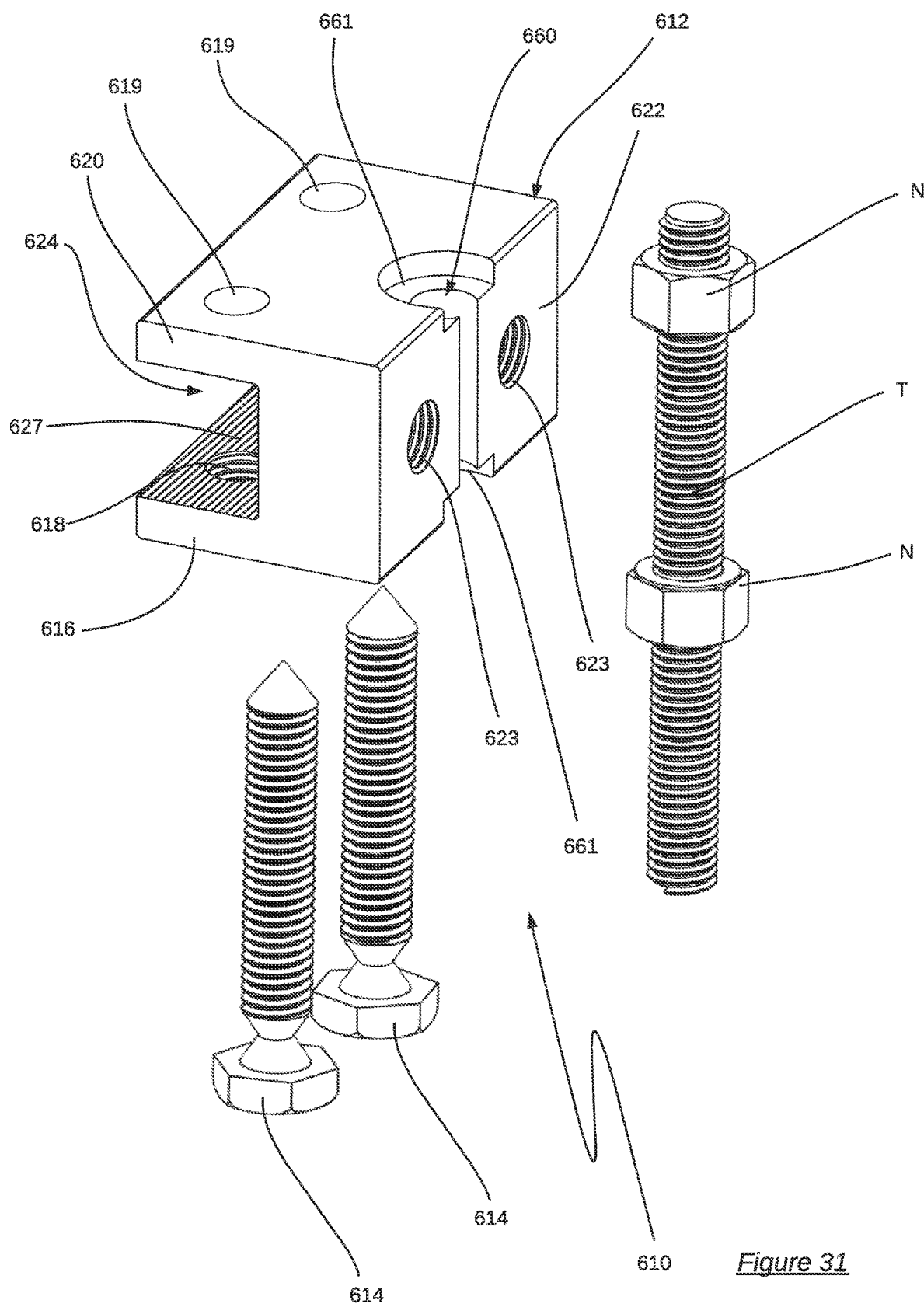
FIG. 31: is an exploded view of a beam clamp according to a fifth embodiment of the present invention.
Figure 32:
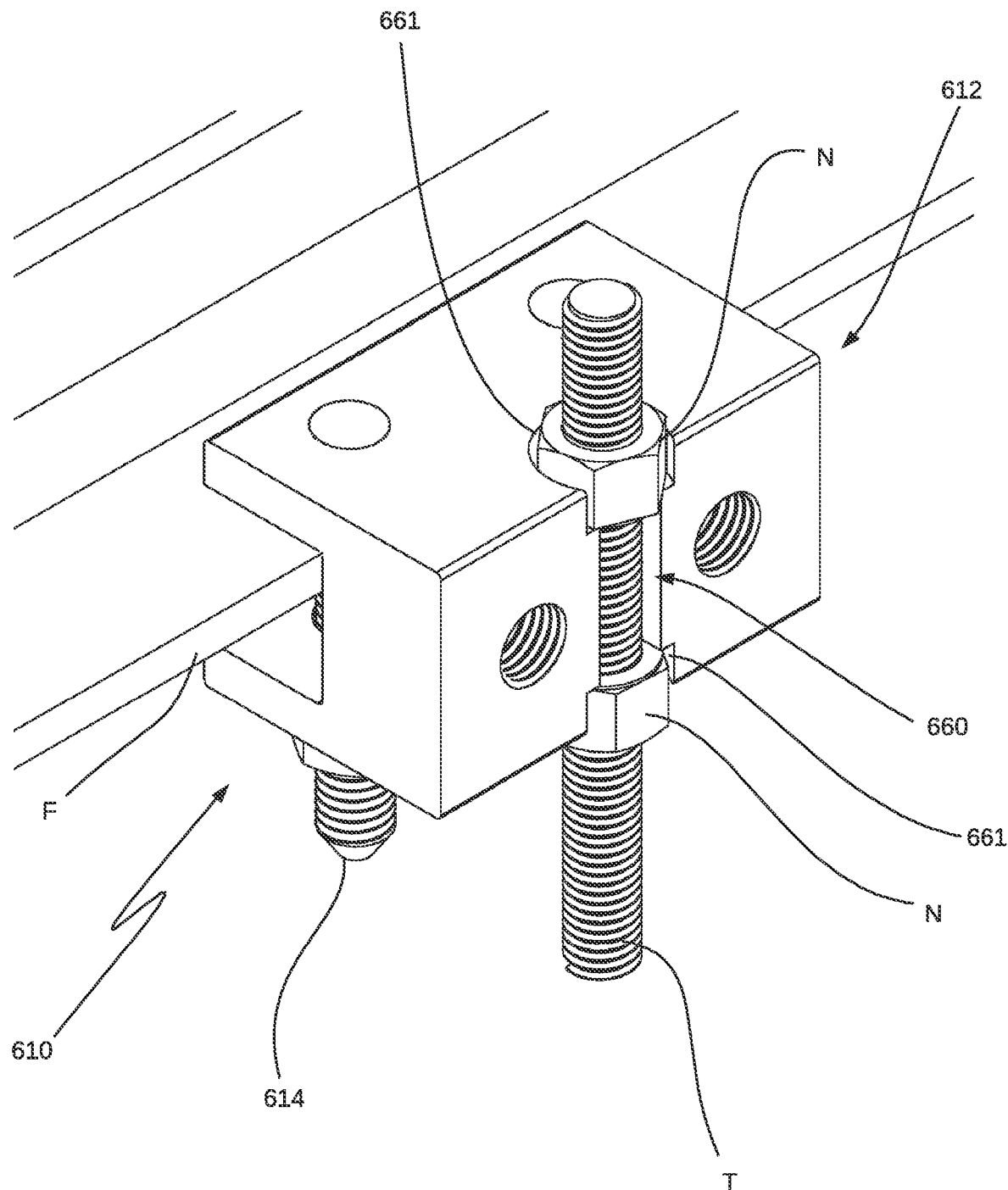
FIG. 32: is a perspective view of the beam clamp shown in FIG. 31 secured to a structural member.
Figure 33:
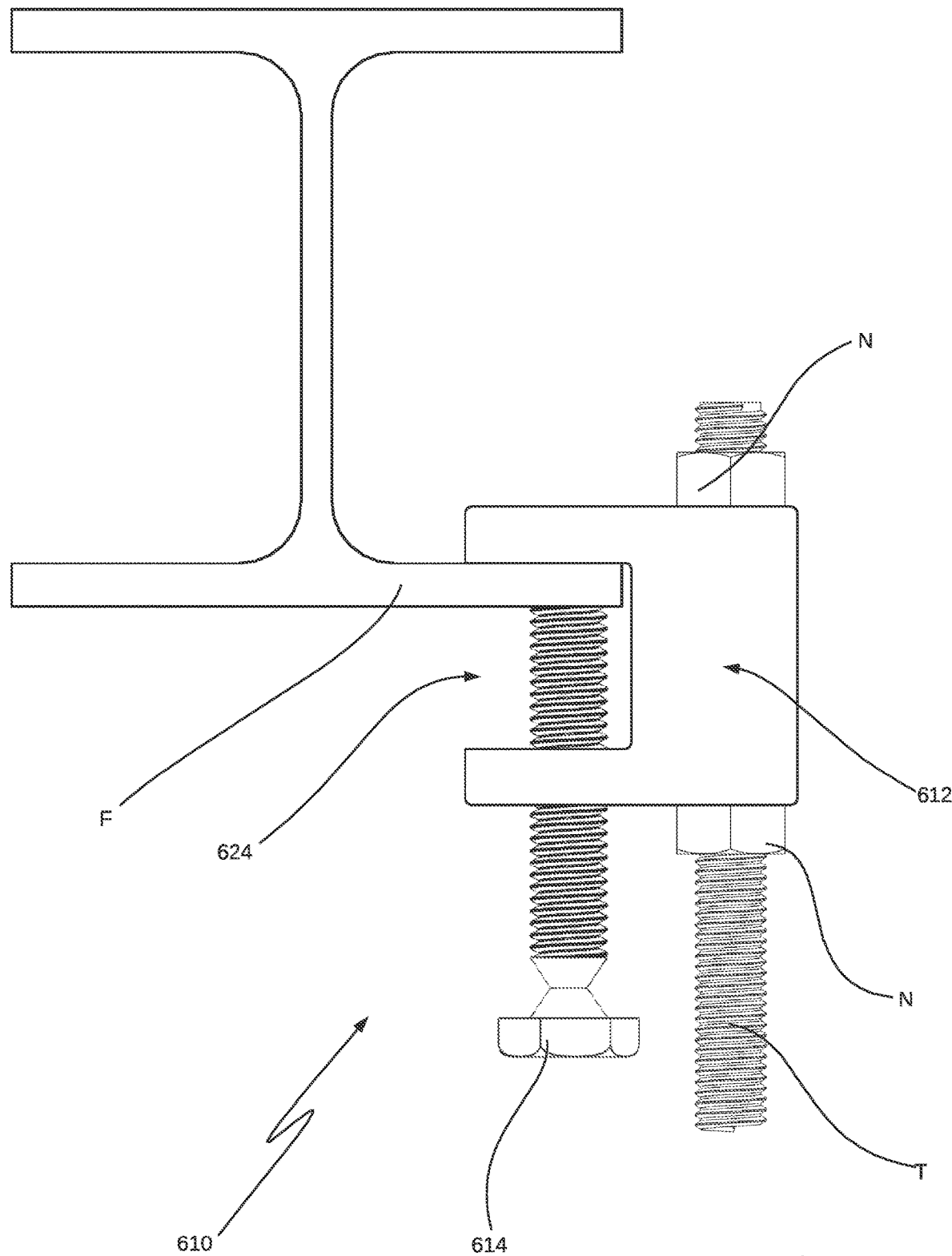
FIG. 33: is a side elevation view of the beam clamp as shown in FIG. 32.

FIGS. 31 to 33 show a beam clamp 610 according to a fourth embodiment of the present invention. The beam clamp 610 includes a clamp body 612, and two set screws 614, all of which are substantially similar to the corresponding components of the beam clamp 10 shown in FIG. 1. As will also be discerned by comparison of the clamp body 12g (shown FIG. 21) with the clamp body 610 it will be apparent that there are also common features. Parts of the beam clamp 610 that are the same or similar to parts of the beam clamp 10 (and clamp body 12g) have the same reference numbers with the prefix "6", and for succinctness will not be described again.

The clamp body 612 has two mounting through holes 618 in the first jaw section 616, and two mounting holes 619 in the second jaw section 620. Further, the first jaw section 618 includes a contact surface 27 that is substantially similar in form and function to the contact surface on the second jaw section 620.

The clamp body 612 has three mounting points. Two of the mounting points are in the form of internally threaded through holes 623 that both extend through the joining section 622.

The third mounting point is located between the two through holes 623. In this example, the third mounting point is a channel 660 in the joining section 622. The clamp body 612 has two opposing faces between which the channel 660 extends.

In this particular embodiment, the clamp body 612 includes two recessed formations 661, one at each end of the channel 660. At the base of each recessed formation 661 is a C-shaped planar surface. The two C-shaped planar surfaces form the two opposing faces between which the channel 660 extends. As shown particularly in FIG. 32, at least part of each nut N locates in the recessed formations 661. The recessed formations 661 resist lateral movement of the nuts N outwardly of the respective recessed formation 661. In this way, the interference between nuts N and the recessed formations 661 resist lateral movement of the threaded rod T outwardly of the channel 660.

As illustrated in FIGS. 32 and 33, an attachment component is to be installed in the channel 660. In this example, the attachment component is in the form of a threaded rod T with a pair of internally threaded nuts N. The threaded rod T is to be located parallel to and within the channel 660, and the nuts N are then installed so as to each abut one of the co-planar faces of the clamp body 612. The nuts N are then tightened, which places the portion of the threaded rod T within the channel 660 in tension. When so installed, the friction between the nuts N and the clamp body 612 resists removal of the threaded rod T from the channel 660. As will be appreciated, the service component can be supported or braced by the threaded rod T.

Figure 34:
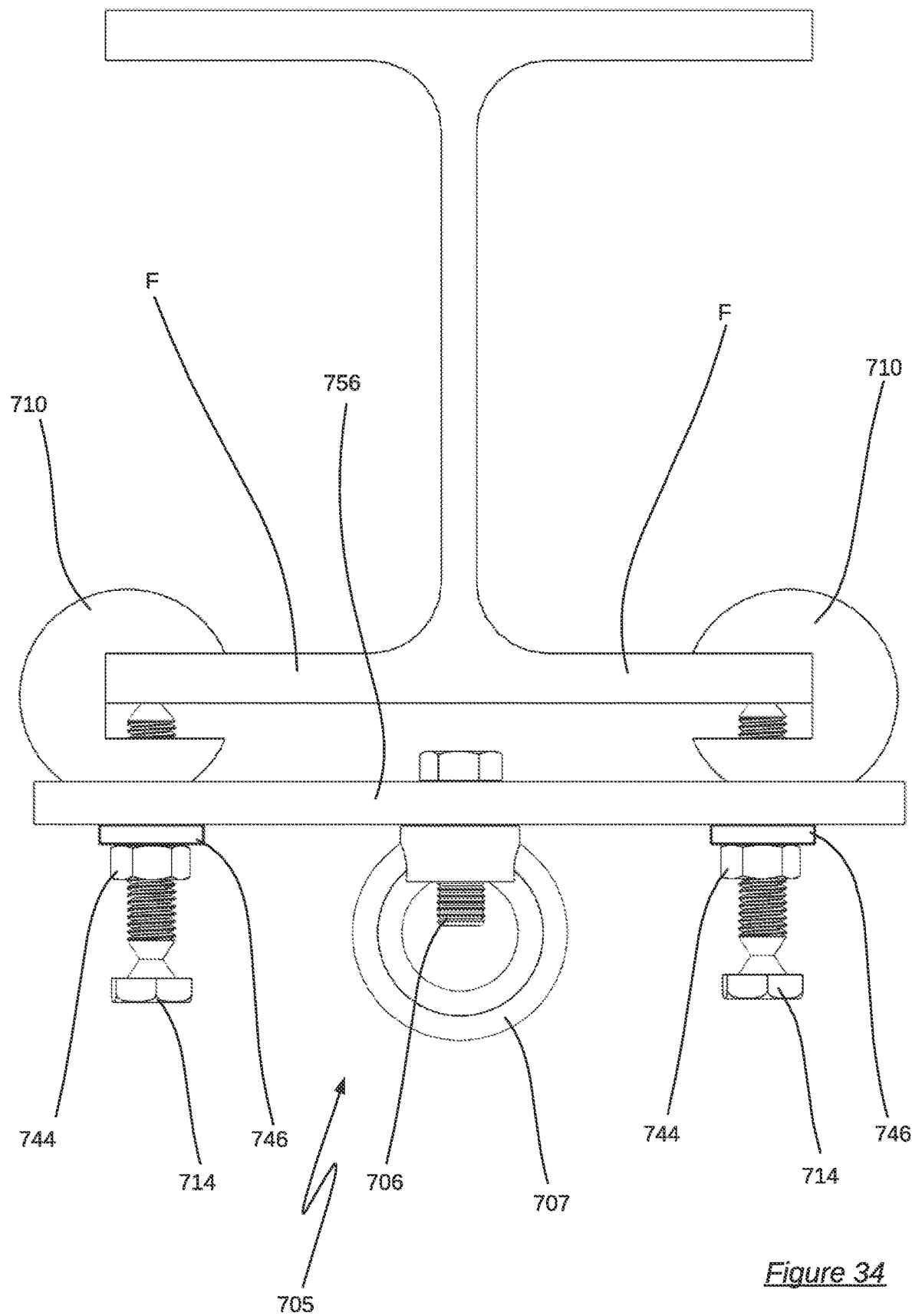
FIG. 34: is an end view of a mounting assembly according to a sixth embodiment of the present invention.
Figure 35:
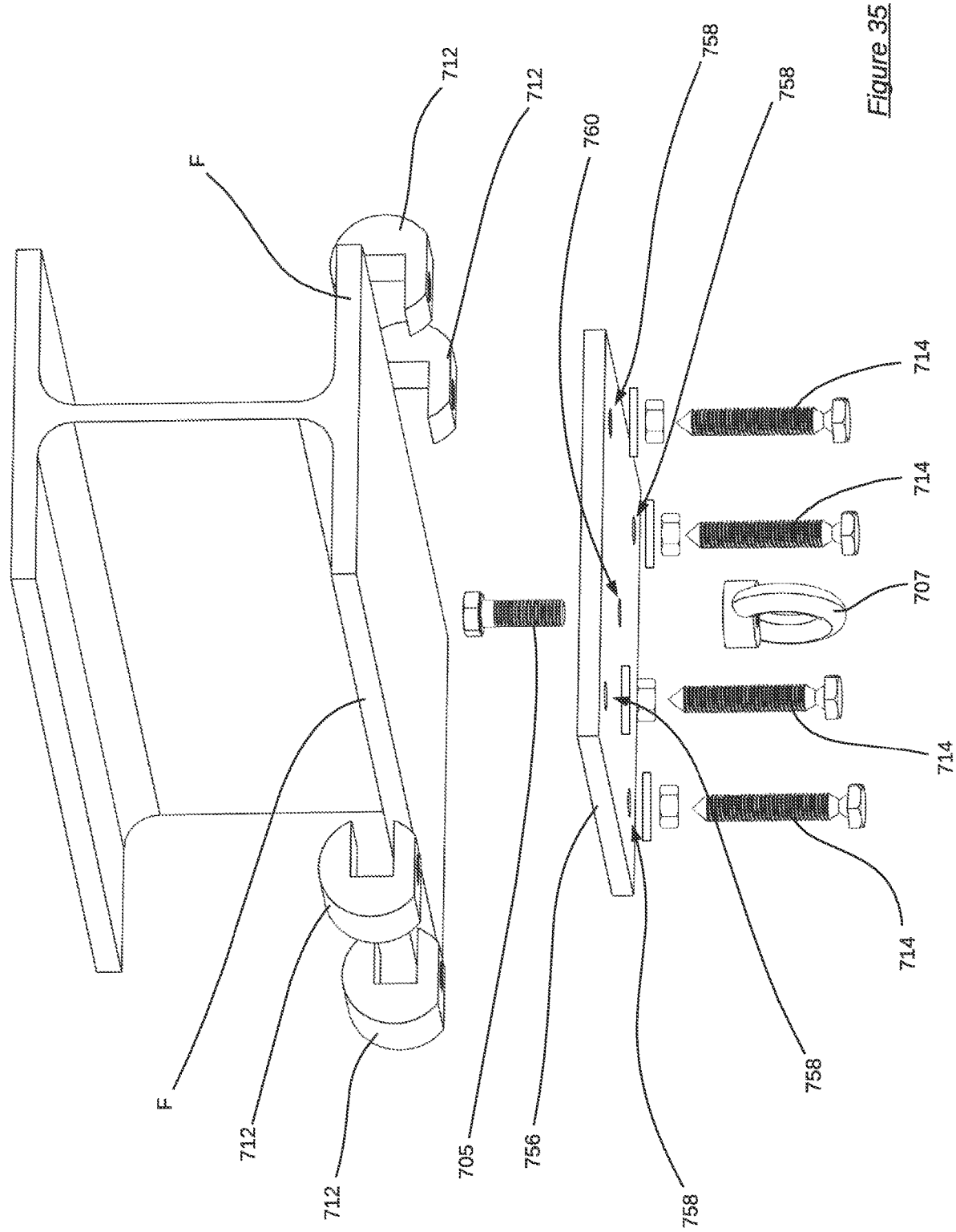
FIG. 35: is a lower perspective exploded view of the mounting assembly shown in FIG. 34.

FIGS. 34 and 35 show a mounting assembly 705 according to another embodiment of the present invention, together with a structural member that has a flange F. In this particular example, the structural member is an I-beam that has two flanges interconnected by a web. As shown in FIG. 34, the mounting assembly 705 is to be attached to the flange of an I-beam. More particularly, the mounting assembly 705 can be attached to the two opposing edges of the flange F. A service component (not shown) is supported or braced from the mounting assembly 705, as described below.

The mounting assembly 705 includes four clamping members 710, and an interconnecting member 756. As will be discerned from the Figures, each clamping member 710 is substantially similar to the beam clamp 10 shown in FIG. 1. Parts of each clamping member 710 that are the same or similar to parts of the beam clamp 10 have the same reference numbers with the prefix "7", and for succinctness will not be described again.

The interconnecting member, which in this embodiment is in the form of a plate 756, interconnects with the four clamping members 710, and includes a mounting point 760 from which to mount an attachment component that, in service, is mounted to the mounting point and supports and/or braces the service component. In the illustrated example, the attachment component is a bolt 706 and eyelet nut 707 pair.

The mounting assembly 705 is secured to the flange F by securing each clamping member 710 to the flange F. This is done in the same manner in which the beam clamp 10 is attached to a flange F.

The plate 756 is configured to interconnect with the clamping members 710. In this example, the plate 756 has a set of four apertures 758, and the set screw 714 of each of the four clamping members 710 is passed through a respective aperture 758. Further, each set screw 714 is installed in the mounting through hole 718 of the corresponding clamp body 712. Four locking nuts 744 and washers 746 are located on the shanks of the set screws 714, with the plate 756 between the locking nuts and washers 744, 746, and the clamp bodies 712. The locking nuts 744 are tightened to secure the plate 756 against the clamp bodies 712. Thus, the clamping members 710 are interconnected by the plate 756.

In this example, the mounting point 760 is a central aperture in the plate 756 through which the shank of the bolt 706 is passed. The eyelet nut 707 is threaded onto the shank of the bolt 706, and when so installed establishes the attachment component. A wire rope (or similar) to which the service component is attached can be passed through the eye of the eyelet nut 707.

The centres of the apertures 758 are positioned at the vertices of a notional quadrilateral. The mounting point 760 is positioned inwardly of the edges of that notional quadrilateral. In addition, the mounting point 760 is equidistant from each of the apertures 758, such that forces applied to the mounting assembly 705 via the mounting point 760 are substantially evenly dispersed between the clamping members 710.

Figure 36:
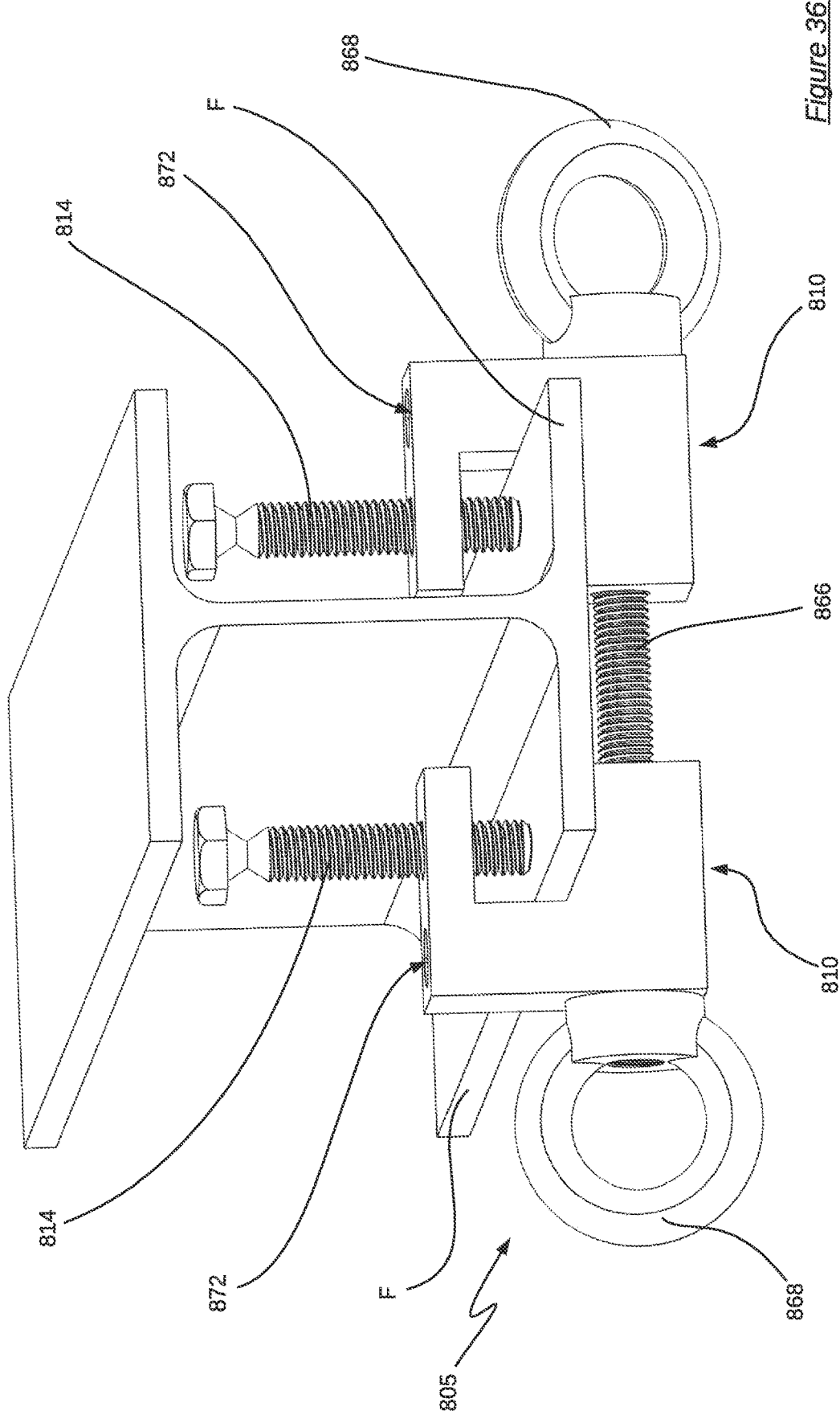
FIG. 36: is a perspective view of a mounting assembly according to a seventh embodiment of the present invention.

FIGS. 36 and 37 show a mounting assembly 805 according to another embodiment of the present invention, together with a structural member that has a flange F. In this particular example, the structural member is an I-beam that has two flanges interconnected by a web. As shown in FIG. 36, the mounting assembly 805 is to be attached to the flange of an I-beam. More particularly, the mounting assembly 805 can be attached to the two opposing edges of the flange F. A service component (not shown) is supported or braced from the mounting assembly 805, as described below.

The mounting assembly 805 includes two clamping members 810, and an interconnecting member. As will be discerned from the Figures, each clamping member 810 is substantially similar to the beam clamp 10 shown in FIG. 1. Parts of each clamping member 810 that are the same or similar to parts of the beam clamp 10 have the same reference numbers with the prefix "8", and for succinctness will not be described again.

It will be noted that the clamp bodies 812 have minor differences in shape and configuration to the clamp body 12. These differences enable each clamp body 812 to have a throughway 870 that extends through the second jaw section 820.

The interconnecting member, which in this embodiment is in the form of a length of threaded rod 866 that engages with a pair of internally threaded eyelet nuts 868, interconnects with the two clamping members 810. Thus, the interconnecting member is supported by the clamping members 810. Each eyelet nut 868 provides a mounting point 860 from which to mount an attachment component that, in service, is mounted to the mounting point and supports and/or braces the service component.

The two clamping members 810 are installed in the manner of the beam clamp 10 as previously described. The threaded rod 866 is then passed through the throughways 870.

The minor differences in shape and configuration of the clamp bodies 812 compared with the clamp body 12 also enable each clamp body 812 to have a secondary throughway 872 that extends through the joining section 822. Each secondary throughway 872 is orthogonal to the respective throughway 870 in the second jaw section 820. As will be appreciated, the secondary throughways 872 can provide additional mounting points for the mounting assembly 805.

In this example, each throughway 870 has a diameter sufficient to provide clearance for the treaded rod 866. Further, each secondary throughway 872 can also have a diameter sufficient to provide clearance for the treaded rod 866.

In some alternative installations, the mounting assembly 805 can be installed with the two clamping members 810 secured to two spaced apart flanges of a common structural member (such as an I-beam), and the threaded rod 866 passed through the secondary throughways 872, and the eyelet nuts 868 engaged with the threaded rod 866. In this way, the threaded rod 866 and eyelet nuts 868 are supported by the clamping members 810, with the longitudinal direction of the threaded rod 866 being transverse to the longitudinal direction of the structural member, and transverse to the plane of the flanges.

In some alternative embodiments, the mounting assembly can use clamping members with a transverse through hole, in a manner similar to the clamping body 12*h* illustrated in FIG. 22. In such embodiments, the mounting assembly can be installed with the two clamping members secured in a spaced apart arrangement on a common flange of a structural member, the threaded rod passed through the transverse through holes, and the eyelet nuts engaged with the threaded rod. In this way, the threaded rod and eyelet nuts are supported by the clamping members, with the longitudinal direction of the threaded rod being parallel to the longitudinal direction of the structural member, and transverse to the plane of the flanges.

It will be appreciated that in some alternative embodiments and/or installations of mounting assemblies, the clamping members can be secured to opposing edges of a flange of a structural member, to a common edge of a flange of a structural member, two spaced apart flanges of a structural member (such that the interconnecting member is generally parallel with a web of the structural member), or to two flanges of separate and spaced apart structural members (such that the interconnecting member "bridges" those structural members).

It will be understood that in this specification and the claims which follow, the order of recitation of aspects of an installed component, device or assembly does not imply an order of installation or procedure.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or any form of suggestion that that prior publication (or information derived from it) or known matter forms part of the common general knowledge in the field of endeavour to which this specification relates.

The invention claimed is:

1. A beam clamp for attachment to a flange of a structural building member and from which to support or brace a service component, the beam damp comprising:
   a clamp body that is made of hardened steel that exceeds the hardness of the structural member, and has a minimum hardness of 150 BHN, the clamp body including:
   a first jaw section that includes at least one mounting through hole,
   at least one second jaw section that has a pair of lateral faces,
   a joining section that interconnects the first and second jaw sections, the first and second jaw sections, and the joining section of the clamp body being formed of a single piece of material,
   a transverse opening that is to receive the flange, the transverse opening being defined by the first and second jaw sections and the joining section, and
   a contact surface on the at least one second jaw section, wherein in use of the beam clamp, the contact surface is in contact with the flange of the structural member, and wherein the contact surface is formed with surface irregularities providing a roughness that enhances engagement of the contact surface with the flange, the contact surface forming vertices with the lateral faces and extending the width of the clamp body that is between the vertices, and the surface irregularities extending the width of the contact surface between the vertices; and
   at least one set screw that is to be installed in the mounting through hole, the set screw having a tip with a leading end with a cross sectional area that is less than the cross sectional area of the shank of the set screw, the cross sectional areas being in planes that are transverse to the longitudinal direction of the shank,
   whereby, in use of the clamp, the flange is secured within transverse opening between the tip of the at least one set screw and the contact surface.

2. The beam clamp according to claim 1, wherein the surface irregularities are in the form of one or more sets of alternating ridges and furrows that are formed in the contact surface.

3. The beam clamp according to claim 1, wherein the ridges and furrows are formed so as to be substantially transverse to the direction of insertion of the flange into the transverse opening.

4. The beam clamp according to claim 1, wherein the amplitude of the surface irregularities is less than 1 mm.

5. The beam clamp according to claim 1, wherein the ratio of the width of the second jaw section between the pair of lateral faces to the minimum separation of the first and second jaw sections is at least 1.25: 1.

6. The beam clamp according to claim 1, wherein the ratio of the depth of the second jaw section to the minimum separation of the first and second jaw sections is at least 1.5:1.

7. The beam clamp according to claim 1, wherein the set screw has a shank with a waisted formation that acts as a stress concentrator such that the shank shears within the waisted formation when a predetermined torque is applied to the shank.

8. The beam clamp according to claim 1, wherein the set screw has a tip that tapers in a direction away from the waisted formation.

9. The beam clamp according to claim 1, wherein the set screw is made of hardened steel.

10. The beam clamp according to claim 1, wherein the beam clamp further comprises a locking nut that is to locate on a portion of the shank of the set screw that projects from the first jaw section away from the transverse opening, wherein the service component is supported by a component that includes an eyelet that, in use of the beam clamp, is captured between the locking nut and the clamp body.

11. The beam clamp according to claim 1, wherein the clamp body includes one or more secondary mounting holes for receiving an externally threaded component, wherein the service component is attached to the beam clamp by the externally threaded component.

12. The beam clamp according to claim 1, wherein the beam clamp is configured such that, when installed on the flange, a throughway is formed within a part of the transverse opening, the throughway being bounded by the flange, the clamp body and the set screw, and wherein the service component is to be supported or braced by a wire rope that is looped through the throughway.

13. A mounting assembly for attachment to a flange of a structural building member and from which to support or brace a service component, the mounting assembly comprising:
   a plurality of clamping members that each have:
      a clamp body that is made of hardened steel that exceeds the hardness of the structural member, and has a minimum hardness of 150 BHN, and that includes:
         a first jaw section that includes at least one mounting through hole,
         at least one second jaw section that has a pair of lateral faces,
         a joining section that interconnects the first and second jaw sections, the first and second jaw sections, and the joining section of the clamp body being formed of a single piece of material,
         a transverse opening that is to receive the flange, the transverse opening being defined by the first and second jaw sections and the joining section, and
         a contact surface on the at least one second jaw section, wherein in use of the mounting assembly, the contact surface is in contact with the flange of the structural member, and wherein the contact surface is formed with surface irregularities providing a roughness that enhances engagement of the contact surface with the
      flange, the contact surface forming vertices with the lateral faces, and the surface irregularities extend the width of the contact surface between the vertices, and
      at least one set screw that is to be installed in the mounting through hole, the set screw having a tip with a leading end with a cross sectional area that is less than the cross sectional area of the shank of the set screw, the cross sectional areas being in planes that are transverse to the longitudinal direction of the shank; and
   an interconnecting member that is configured to interconnect with the clamping members, and that includes one or more mounting points from which to mount an attachment component,
      whereby, in use of the mounting assembly:
      each clamping member is secured to the structural member by securing the flange within the transverse opening between the tip of the at least one set screw and the contact surface,
      the interconnecting member is secured to the clamping members such that the clamping members are interconnect by the interconnecting member, and
      the service component is supported or braced by an attachment component that mounts to at least one of the mounting points.

14. The mounting assembly according to claim 13, wherein the interconnecting member is a connecting plate that has a plurality of primary apertures, and the mounting assembly further comprises a plurality of fasteners, whereby, in use of the mounting assembly the connecting plate is mounted adjacent the clamping members with the shanks of the set screws extending through the primaly apertures, and with the fasteners securing the connecting plate to the clamping members.

15. The mounting assembly according to claim 14, wherein the mounting assembly has two or more clamping members, and the connecting plate has two or more primary apertures, the centres of the apertures arranged linearly such that the mounting assembly is mountable along a single edge of a flange of the structural member.

16. The mounting assembly according to claim 14, wherein the mounting assembly has three or more clamping members, and
   the connecting plate has three or more primary apertures, and the centres of the apertures are positioned at the vertices of a notional polygon, wherein the mounting assembly is mountable on two spaced apart edges of a flange of the structural member. Preferably, the mounting points are positioned inwardly of the edges of the notional polygon.

17. The mounting assembly according to claim 16, wherein the mounting assembly has four clamping members, and the connecting plate has four primary apertures, and the centres of the apertures are positioned at the vertices of a notional quadrilateral.

18. The mounting assembly according to claim 13, wherein the interconnecting member includes an elongate member that extends through throughways formed in the clamp bodies.

* * * * *